United States Patent
Gao et al.

(10) Patent No.: US 10,405,138 B2
(45) Date of Patent: Sep. 3, 2019

(54) METHOD AND DEVICE FOR OUTPUTTING NOTIFICATION

(71) Applicant: Huawei Technologies Co., Ltd., Shenzhen (CN)

(72) Inventors: Guangyuan Gao, Beijing (CN); Wenmei Gao, Beijing (CN); Junlong Li, Beijing (CN); Junlei Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/072,450

(22) PCT Filed: Jan. 28, 2016

(86) PCT No.: PCT/CN2016/072584
§ 371 (c)(1),
(2) Date: Jul. 24, 2018

(87) PCT Pub. No.: WO2017/128213
PCT Pub. Date: Aug. 3, 2017

(65) Prior Publication Data
US 2019/0037345 A1   Jan. 31, 2019

(51) Int. Cl.
*H04W 4/021*   (2018.01)
*H04W 4/02*   (2018.01)
(Continued)

(52) U.S. Cl.
CPC ............ *H04W 4/022* (2013.01); *G06F 16/00* (2019.01); *G06F 16/29* (2019.01); *H04W 4/021* (2013.01);
(Continued)

(58) Field of Classification Search
CPC ......... H04W 4/021–023; H04W 4/026; H04W 4/027; H04W 4/029; H04W 4/12; H04W 68/02; G06F 16/00; G06F 16/29
See application file for complete search history.

(56) References Cited

U.S. PATENT DOCUMENTS

| 2012/0126974 A1 | 5/2012 | Phillips et al. |
| 2013/0085861 A1 | 4/2013 | Dunlap |

(Continued)

FOREIGN PATENT DOCUMENTS

| CN | 103842845 A | 6/2014 |
| CN | 104063509 A | 9/2014 |

(Continued)

*Primary Examiner* — Wayne H Cai
(74) *Attorney, Agent, or Firm* — Slater Matsil, LLP

(57) ABSTRACT

A notification method includes obtaining, according to period t1, coordinates a1 and a speed v1 of a device after a first geo-fence is set, setting a second geo-fence in response to coordinates a1 being outside the first geo-fence and v1 exceeding a threshold, where the initial radius of the second geo-fence is greater than that of the first geo-fence and a center point of the second geo-fence is the same as that of the first geo-fence, obtaining, according to t1, coordinates a2 and a speed v2 of the device after the second geo-fence is set, adjusting period t1 to a period t2 in response to the coordinates a2 being within the second geo-fence and outside the first geo-fence, obtaining, according to the period t2, coordinates a3 and speed v3 of the portable electronic device, and outputting a notification when the geographical coordinates a3 are located within the first geo-fence.

13 Claims, 19 Drawing Sheets

(51) Int. Cl.
  *H04W 4/029* (2018.01)
  *G06F 16/00* (2019.01)
  *G06F 16/29* (2019.01)
  *H04W 68/02* (2009.01)
  *H04W 4/12* (2009.01)

(52) U.S. Cl.
  CPC .......... *H04W 4/023* (2013.01); *H04W 4/026* (2013.01); *H04W 4/027* (2013.01); *H04W 4/029* (2018.02); *H04W 68/02* (2013.01); *H04W 4/12* (2013.01)

(56) References Cited

U.S. PATENT DOCUMENTS

| | | |
|---|---|---|
| 2013/0326137 A1 | 12/2013 | Bilange et al. |
| 2014/0187256 A1* | 7/2014 | Modali ................ H04W 4/027 455/456.1 |
| 2015/0038173 A1 | 2/2015 | Jackson et al. |
| 2015/0215736 A1 | 7/2015 | Josefiak et al. |
| 2015/0237472 A1* | 8/2015 | Alsina ................. H04W 4/021 455/456.3 |
| 2015/0358774 A1 | 12/2015 | Haro et al. |
| 2016/0154117 A1* | 6/2016 | Baudia .................... G01S 19/34 342/357.31 |

FOREIGN PATENT DOCUMENTS

| | | |
|---|---|---|
| CN | 104350769 A | 2/2015 |
| CN | 104487805 A | 4/2015 |

\* cited by examiner

METHOD AND DEVICE FOR OUTPUTTING NOTIFICATION

CROSS-REFERENCE TO RELATED APPLICATIONS

This application claims the benefit of International Application No. PCT/CN2016/072584, filed on Jan. 28, 2016, which application is hereby incorporated by reference.

TECHNICAL FIELD

The present invention relates to the field of communications technologies, and in particular, to a notification outputting method and a device.

BACKGROUND

Geo-fencing (Geo-fencing) is a new application of a location based service (Location Based Service, LBS). Specifically, in the application, a virtual fence may be used to form a virtual geographical boundary on an electronic map of a portable electronic device (such as a mobile phone). The portable electronic device may give a notification or a reminder when the portable electronic device enters or leaves a specific geographical area related to the virtual geographical boundary, or moves in the specific geographical area.

For example, the portable electronic device may receive user settings. A geo-fence is set in a corresponding location (such as a gas station, a bank, a supermarket, or a scenic spot) on the electronic map of the portable electronic device, and a notification or a reminder is given to a user when the portable electronic device approaches, enters, or leaves the geo-fence.

However, to reduce power consumption of the portable electronic device, frequency of sampling performed by the portable electronic device on geographical location coordinates of the portable electronic device cannot be excessively high. In this case, when the portable electronic device fast goes through the geo-fence, it is quite possible that the portable electronic device does not perform, within the geo-fence or at a point near the geo-fence, sampling on geographical location coordinates of the portable electronic device, and the portable electronic device does not give a reminder about the geo-fence to a user. As a result, the geo-fencing application cannot work properly.

SUMMARY

Embodiments of the present invention provide a notification outputting method and a device, so as to resolve a problem that a geo-fencing application cannot work properly when a portable electronic device moves fast.

To achieve the foregoing objective, the following technical solutions are used in the embodiments of the present invention.

According to a first aspect, a notification outputting method is provided, where the method is applied to a portable electronic device and includes obtaining geographical coordinates $a_1$ and a moving speed $v_1$ of the portable electronic device after a geo-fence is set, adjusting a radius of the geo-fence from $r_1$ to $r_2$ when the geographical coordinates $a_1$ are located outside the geo-fence and the moving speed $v_1$ is greater than a preset threshold, where $r_2 > r_1$, obtaining geographical coordinates $a_2$ and a moving speed $v_2$ of the portable electronic device; and outputting a notification when the geographical coordinates $a_2$ are located within the geo-fence whose radius is $r_2$.

It should be understood that, $r_1$ may be an initial radius of the geo-fence, or may be a radius, of the geo-fence, obtained after an initial radius is adjusted and before adjustment is performed for this time.

It should be understood that, when the geographical coordinates $a_1$ of the portable electronic device are located outside the geo-fence, it indicates that the portable electronic device approaches but does not reach the geo-fence. In this case, if the moving speed $v_1$ of the portable electronic device is greater than the preset threshold, it indicates that the portable electronic device fast goes through the geo-fence. The portable electronic device may not collect geographical location coordinates within the geo-fence because of a relatively small radius of the geo-fence, and does not give a reminder about the geo-fence to a user.

According to this solution, the radius of the geo-fence may be increased when the geographical coordinates $a_1$ of the portable electronic device are located outside the geo-fence and the moving speed $v_1$ of the portable electronic device is greater than the preset threshold, that is, when the portable electronic device approaches but does not reach the geo-fence and the portable electronic device will fast go through the geo-fence. On the premise that frequency of collecting geographical location coordinates keeps unchanged, increasing the radius of the geo-fence can increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

For example, the preset threshold in the first aspect may be specifically an upper speed limit $v_{12}$ within a speed range $[v_{11}, v_{12}]$. $[v_{11}, v_{12}]$ is a preconfigured speed range corresponding to $r_1$.

Optionally, $r_2$ in the first aspect may be a preconfigured radius that has a mapping relationship with a speed range $[v_{21}, v_{22}]$ to which $v_1$ belongs, where $v_{21} \leq v_1 \leq v_{22}$.

It should be understood that, generally, $v_{21} \leq v_1 \leq v_{22}$, but it is possible that $v_2$ is greater than $v_{22}$. Further, a method for obtaining a moving speed of the portable electronic device includes dividing a distance between geographical coordinates obtained at two times by a time difference for obtaining the geographical coordinates at two times, to obtain a moving speed of the portable electronic device.

Optionally, a period for obtaining coordinates and a speed of the portable electronic device decreases as the speed increases; or a period for obtaining coordinates and a speed of the portable electronic device keeps unchanged.

Preferably, geographical coordinates and a moving speed of the portable electronic device may be periodically obtained according to a fixed period $t_1$, or the period for obtaining geographical coordinates and a moving speed of the portable electronic device may be dynamically adjusted. Specifically, the method may further include after the adjusting a radius of the geo-fence from $r_1$ to $r_2$ when the geographical coordinates $a_1$ are located outside the geo-fence whose radius is $r_1$ and the moving speed $v_1$ is greater than a preset threshold, adjusting the period for obtaining, by the portable electronic device, geographical coordinates and a moving speed of the portable electronic device from $t_1$ to $t_2$, where $t_2 < t_1$.

It should be understood that, $t_1$ may be an initial period for obtaining, by the portable electronic device, geographical coordinates and a moving speed of the portable electronic device, or may be a period, used before being adjusted to $t_2$, for obtaining, by the portable electronic device, geographical coordinates and a moving speed of the portable electronic device.

Preferably, $r_1$ in the first aspect may be a product of the moving speed $v_1$ and $t_1$.

In this solution, the radius of the geo-fence may be increased, and the period for obtaining geographical coordinates and a moving speed of the portable electronic device may be decreased when an increasing amplitude of the moving speed of the portable electronic device is greater than a preset amplitude threshold. In this way, frequency of collecting geographical location coordinates can be increased. Higher frequency of collecting geographical location coordinates indicates a higher possibility that the portable electronic device collects geographical location coordinates within the geo-fence. This can further increase a possibility that a geo-fencing application works properly.

According to a second aspect, a notification outputting method is provided, where the method is applied to a portable electronic device and includes periodically obtaining, according to a period $t_1$, geographical coordinates $a_1$ and a moving speed $v_1$ of the portable electronic device after a geo-fence is set, adjusting the period for obtaining geographical coordinates and a moving speed of the portable electronic device from $t_1$ to $t_2$, when the geographical coordinates $a_1$ are located outside the geo-fence and the moving speed $v_1$ is greater than a first preset threshold, where $t_2 < t_1$, periodically obtaining, according to the period $t_2$, geographical coordinates $a_2$ and a moving speed $v_2$ of the portable electronic device, and outputting a notification when the geographical coordinates $a_2$ are located within the geo-fence.

It should be understood that, when the geographical coordinates $a_1$ of the portable electronic device are located outside the geo-fence, it indicates that the portable electronic device approaches but does not reach the geo-fence. In this case, if the moving speed $v_1$ of the portable electronic device is greater than the first preset threshold, it indicates that the portable electronic device fast goes through the geo-fence. The portable electronic device may not collect geographical location coordinates within the geo-fence because of relatively low frequency of collecting geographical location coordinates by the portable electronic device (that is, a relatively long period), and does not give a reminder about the geo-fence to a user.

According to this solution, the period for collecting geographical location coordinates by the portable electronic device may be decreased, that is, frequency of collecting geographical location coordinates by the portable electronic device may be increased, when the geographical coordinates $a_1$ of the portable electronic device are located outside the geo-fence and the moving speed $v_1$ of the portable electronic device is greater than the first preset threshold, that is, when the portable electronic device approaches but does not reach the geo-fence and the portable electronic device will fast go through the geo-fence. In this way, a possibility that the portable electronic device collects geographical location coordinates within the geo-fence can be increased, so that a possibility that the portable electronic device detects that the portable electronic device is located within the geo-fence can be increased, thereby increasing a possibility that a geo-fencing application works properly.

For example, the first preset threshold in the second aspect may be specifically an upper speed limit $v_{12}$ within a speed range $[v_{11}, v_{12}]$.

It should be understood that, $t_1$ may be an initial period for obtaining, by the portable electronic device, geographical coordinates and a moving speed of the portable electronic device, or may be a period, used before being adjusted to $t_2$, for obtaining, by the portable electronic device, geographical coordinates and a moving speed of the portable electronic device.

The period $t_2$ in the second aspect may be specifically a preconfigured period that has a mapping relationship with a speed range $[v_{21}, v_{22}]$ to which $v_1$ belongs, where $v_{21} \leq v_1 \leq v_{22}$.

Further, the radius of the geo-fence may be increased in addition to adjusting the period for collecting, by the portable electronic device, geographical location coordinates.

Specifically, after the periodically obtaining, according to the period $t_2$, geographical coordinates $a_2$ and a moving speed $v_2$ of the portable electronic device, the method further includes adjusting a radius of the geo-fence from $r_1$ to $r_2$ when the geographical coordinates $a_2$ are located outside the geo-fence and the moving speed $v_2$ is greater than the first preset threshold or a second preset threshold, where $r_2 > r_1$, and the second preset threshold is greater than the first preset threshold.

It should be understood that, $r_1$ may be an initial radius of the geo-fence, or may be a radius, of the geo-fence, obtained after an initial radius is adjusted and before adjustment is performed for this time.

Optionally, $r_2$ in the second aspect may be a preconfigured radius that has a mapping relationship with a speed range $[v_{31}, v_{32}]$ to which the moving speed $v_2$ belongs, where $v_{31} \leq v_2 \leq v_{32}$.

Preferably, $r_2$ in the second aspect may be a product of the moving speed $v_2$ and the period $t_2$.

Similar to the technical effects achieved by increasing the radius of the geo-fence in the first aspect, increasing the radius of the geo-fence herein can further increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

According to a third aspect, a notification outputting method is provided, where the method is applied to a portable electronic device and includes periodically obtaining, according to a period $t_1$, geographical coordinates $a_1$ and a moving speed $v_1$ of the portable electronic device after a first geo-fence is set, where an initial radius of the first geo-fence is $r_1$, setting a second geo-fence when the geographical coordinates $a_1$ are located outside the first geo-fence and the moving speed $v_1$ is greater than a preset threshold, where an initial radius of the second geo-fence is $r_2$, $r_2 > r_1$, and a center point of the second geo-fence is the same as that of the first geo-fence, periodically obtaining, according to the period $t_1$, geographical coordinates $a_2$ and a moving speed $v_2$ of the portable electronic device after the second geo-fence is set, adjusting the period for obtaining geographical coordinates and a moving speed of the portable electronic device from $t_1$ to $t_2$, when the geographical coordinates $a_2$ are located within the second geo-fence and are located outside the first geo-fence, where $t_2 < t_1$, periodically obtaining, according to the period $t_2$, geographical coordinates $a_3$ and a moving speed $v_3$ of the portable electronic device, and outputting a notification when the geographical coordinates $a_3$ are located within the first geo-fence.

It should be understood that, when the geographical coordinates $a_1$ of the portable electronic device are located outside the first geo-fence, it indicates that the portable electronic device approaches but does not reach the first geo-fence. In this case, if the moving speed $v_1$ of the portable electronic device is greater than the preset threshold, it indicates that the portable electronic device fast goes through the first geo-fence. The portable electronic device may not collect geographical location coordinates within the first geo-fence because of a relatively small radius of the first geo-fence or relatively low frequency of collecting geographical location coordinates by the portable electronic device (that is, a relatively long period), and does not give a reminder about the first geo-fence to a user.

According to this solution, the second geo-fence may be set when the geographical coordinates $a_1$ of the portable electronic device are located outside the first geo-fence and the moving speed $v_1$ is greater than the preset threshold, that is, when the portable electronic device approaches but does not reach the first geo-fence and the portable electronic device will fast go through the first geo-fence. The radius $r_2$ of the second geo-fence is greater than the radius $r_1$ of the first geo-fence; therefore, a possibility that the portable electronic device collects geographical location coordinates within the second geo-fence is higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, the period for collecting geographical location coordinates by the portable electronic device is decreased, that is, frequency of collecting geographical location coordinates by the portable electronic device is increased, when the geographical coordinates $a_2$ are located within the second geo-fence and are located outside the first geo-fence. In this way, a possibility that the portable electronic device collects geographical location coordinates within the first geo-fence can be increased, so that a possibility that the portable electronic device detects that the portable electronic device is located within the first geo-fence can be increased, thereby increasing a possibility that a geo-fencing application works properly.

For example, the preset threshold in the third aspect may be specifically an upper speed limit $v_{12}$ within a speed range $[v_{11}, v_{12}]$. $[v_{11}, v_{12}]$ is a preconfigured speed range corresponding to $r_1$.

The period $t_2$ in the third aspect may be specifically a preconfigured period that has a mapping relationship with a speed range $[v_{21}, v_{22}]$ to which $v_1$ belongs, where $v_{21} \leq v_1 \leq v_{22}$.

Further, the portable electronic device may increase the radius of the first geo-fence in addition to adjusting the period for collecting, by the portable electronic device, geographical location coordinates.

Specifically, after the adjusting the period for obtaining geographical coordinates and a moving speed of the portable electronic device from $t_1$ to $t_2$, the method further includes adjusting the radius of the first geo-fence from $r_1$ to $r_3$, where $r_3$ is greater than $r_1$, and $r_3$ is less than $r_2$.

It should be understood that, similar to the technical effects achieved by increasing the radius of the geo-fence in the first aspect or the second aspect, increasing the radius of the first geo-fence herein can further increase a possibility that the portable electronic device collects geographical location coordinates within the first geo-fence, so that a possibility that the portable electronic device detects that the portable electronic device is located within the first geo-fence can be increased, thereby increasing a possibility that a geo-fencing application works properly.

Preferably, $r_2$ is greater than or equal to a sum of $r_1$ and a product of $v_1$ and $t_1$, that is, $r_2 \geq v_1 \times T_0 + r_1$.

It should be understood that, the portable electronic device at least collects geographical location coordinates once within the second geo-fence when the radius of the second geo-fence is $r_2 \geq v_1 \times t_1 + r_1$. In this way, the period for obtaining geographical coordinates and a moving speed of the portable electronic device can be definitely adjusted, so that a possibility that the portable electronic device detects that the portable electronic device is located within the first geo-fence can be definitely increased, thereby definitely increasing a possibility that a geo-fencing application works properly.

According to a fourth aspect, a notification outputting method is provided, where the method is applied to a portable electronic device and includes periodically obtaining, according to a period $t_1$, geographical coordinates $a_1$ and a moving speed $v_1$ of the portable electronic device after a first geo-fence is set, where an initial radius of the first geo-fence is $r_1$, setting a second geo-fence when the geographical coordinates $a_1$ are located outside the first geo-fence and the moving speed $v_1$ is greater than a preset threshold, where an initial radius of the second geo-fence is $r_2$, $r_2 > r_1$, and a center point of the second geo-fence is the same as that of the first geo-fence, periodically obtaining, according to a period $t_2$, geographical coordinates $a_2$ and a moving speed $v_2$ of the portable electronic device after the second geo-fence is set, and when the geographical coordinates $a_2$ are located within the second geo-fence and are located outside the first geo-fence, outputting a notification after preset duration.

Similar to the notification outputting method provided in the third aspect, in this solution, a possibility that the portable electronic device collects geographical location coordinates within the second geo-fence is higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, according to this solution, when the obtained geographical coordinates $a_2$ are located within the second geo-fence and are located outside the first geo-fence, a notification may be output after a delay of the preset duration. This can ensure that a geo-fencing application works properly.

It should be noted that, for a specific description of the preset threshold in the fourth aspect, reference may be made to the detailed descriptions of the preset threshold in any one of the foregoing aspects. Details are not described herein again.

Further, after the second geo-fence is set, the fixed period $t_1$ may be used to obtain geographical coordinates and a moving speed of the portable electronic device, that is, $t_2 = t_1$. Certainly, the period for obtaining geographical coordinates and a moving speed of the portable electronic device may alternatively be decreased, that is, $t_2 < t_1$.

Similar to the technical effects achieved by decreasing the period for obtaining geographical coordinates and a moving speed of the portable electronic device in the first aspect, decreasing the period for obtaining geographical coordinates and a moving speed of the portable electronic device herein can further increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

Further, the preset duration may be preconfigured fixed duration.

Preferably, the preset duration may be adjusted in real time according to the moving speed of the portable electronic device, so that the preset duration decreases as the moving speed of the portable electronic device increases.

For example, the portable electronic device may adjust the preset duration from $\Delta T$ to $\Delta T - \Delta t$ when a difference between the moving speed $v_2$ and the moving speed $v_1$, $\Delta v = v_2 - v_1$, is greater than a preset difference, where $\Delta t > 0$.

It should be understood that, when the moving speed of the portable electronic device increases, it indicates that the portable electronic device will enter the geo-fence (the first geo-fence) in a relatively short time. In this case, the preset duration is decreased, that is, a delay time for notification outputting is decreased. This can reduce a possibility that after the portable electronic device enters the geo-fence, the portable electronic device does not output a notification in time because the moving speed of the portable electronic device increases.

It should be noted that, all the notification outputting methods in the foregoing aspects are applied to a scenario in which the portable electronic device approaches the geo-fence.

Certainly, the notification outputting method may further include, during a process in which the portable electronic device leaves a center point of the foregoing geo-fence or the first geo-fence (collectively referred to as a geo-fence herein), if an obtained geographical coordinates are located outside the geo-fence, adjusting the period for obtaining geographical coordinates and a moving speed of the portable electronic device from $t_2$ to $t_1$.

According to a fifth aspect, a notification outputting method is provided, where the method is applied to a portable electronic device and includes obtaining geographical coordinates $a_1$ and a moving speed $v_1$ of the portable electronic device after a geo-fence is set, calculating a distance between the geographical coordinates $a_1$ and a center point of the geo-fence when the geographical coordinates $a_1$ are located outside the geo-fence and the moving speed $v_1$ is greater than a first preset value, and if the distance between the geographical coordinates $a_1$ and the center point of the geo-fence is less than a second preset value, outputting a notification after preset duration.

According to this solution, when the geographical coordinates $a_1$ are located outside the geo-fence whose radius is $r_1$ and the moving speed $v_1$ is greater than the first preset value (that is, the portable electronic device approaches but does not reach the geo-fence, and will fast go through the geo-fence), if the distance between the geographical coordinates $a_1$ of the portable electronic device and the center point of the geo-fence is less than the second preset value, a notification may be output after a delay of the preset duration. This can ensure that a geo-fencing application works properly.

It should be understood that, the preset duration herein is similar to that in the fourth aspect. Details are not described herein again.

It should be noted that, a method for obtaining a moving speed of the portable electronic device in the second aspect to the fifth aspect is similar to the method for obtaining a moving speed of the portable electronic device in the first aspect in the embodiments of the present invention. Details are not described in this embodiment of the present invention herein again.

According to a sixth aspect, a portable electronic device is provided. The portable electronic device includes units and/or modules configured to execute the notification outputting method according to the first aspect and various optional manners of the first aspect. These units and/or modules are obtained by means of logical division performed on the portable electronic device, so as to execute the notification outputting method according to the first aspect and various optional manners of the first aspect.

For a related description of the sixth aspect and technical effects thereof, reference may be made to the related descriptions of the first aspect and various optional manners of the first aspect. Details are not described herein again.

According to a seventh aspect, a portable electronic device is provided. The portable electronic device includes units and/or modules configured to execute the notification outputting method according to the second aspect and various optional manners of the second aspect. These units and/or modules are obtained by means of logical division performed on the portable electronic device, so as to execute the notification outputting method according to the second aspect and various optional manners of the second aspect.

For a related description of the seventh aspect and technical effects thereof, reference may be made to the related descriptions of the second aspect and various optional manners of the second aspect. Details are not described herein again.

According to an eighth aspect, a portable electronic device is provided. The portable electronic device includes units and/or modules configured to execute the notification outputting method according to the third aspect and various optional manners of the third aspect. These units and/or modules are obtained by means of logical division performed on the portable electronic device, so as to execute the notification outputting method according to the third aspect and various optional manners of the third aspect.

For a related description of the eighth aspect and technical effects thereof, reference may be made to the related descriptions of the third aspect and various optional manners of the third aspect. Details are not described herein again.

According to a ninth aspect, a portable electronic device is provided. The portable electronic device includes units and/or modules configured to execute the notification outputting method according to the fourth aspect and various optional manners of the fourth aspect. These units and/or modules are obtained by means of logical division performed on the portable electronic device, so as to execute the notification outputting method according to the fourth aspect and various optional manners of the fourth aspect.

For a related description of the ninth aspect and technical effects thereof, reference may be made to the related descriptions of the fourth aspect and various optional manners of the fourth aspect. Details are not described herein again.

According to a tenth aspect, a portable electronic device is provided. The portable electronic device includes units and/or modules configured to execute the notification outputting method according to the fifth aspect and various optional manners of the fifth aspect. These units and/or modules are obtained by means of logical division performed on the portable electronic device, so as to execute the notification outputting method according to the fifth aspect and various optional manners of the fifth aspect.

For a related description of the tenth aspect and technical effects thereof, reference may be made to the related descriptions of the fifth aspect and various optional manners of the fifth aspect. Details are not described herein again.

According to an eleventh aspect, a portable electronic device is provided, where the portable electronic device includes one or more processors, a memory, a bus system, a transceiver, and one or more application programs, where the one or more processors, the memory, and the transceiver are connected by using the bus system, and the one or more application programs are stored in the memory, the one or more application programs include an instruction, and when the processor of the portable electronic device executes the instruction, the portable electronic device executes the notification outputting method according to the first aspect and various optional manners of the first aspect.

According to a twelfth aspect, a computer-readable storage medium is provided, where the computer-readable storage medium stores one or more programs, the one or more programs include an instruction, and when a processor of the portable electronic device executes the instruction, the portable electronic device executes the notification outputting method according to the first aspect and various optional manners of the first aspect.

According to a thirteenth aspect, a portable electronic device is provided, where the portable electronic device includes one or more processors, a memory, a bus system, a transceiver, and one or more application programs, where the one or more processors, the memory, and the transceiver are connected by using the bus system, and the one or more application programs are stored in the memory, the one or more application programs include an instruction, and when the processor of the portable electronic device executes the instruction, the portable electronic device executes the notification outputting method according to the second aspect and various optional manners of the second aspect.

According to a fourteenth aspect, a non-transitory computer-readable storage medium is provided, where the computer-readable storage medium stores one or more programs, the one or more programs include an instruction, and when a processor of the portable electronic device executes the instruction, the portable electronic device executes the notification outputting method according to the second aspect and various optional manners of the second aspect.

According to a fifteenth aspect, a portable electronic device is provided, where the portable electronic device includes one or more processors, a memory, a bus system, a transceiver, and one or more application programs, where the one or more processors, the memory, and the transceiver are connected by using the bus system, and the one or more application programs are stored in the memory, the one or more application programs include an instruction, and when the processor of the portable electronic device executes the instruction, the portable electronic device executes the notification outputting method according to the third aspect and various optional manners of the third aspect.

According to a sixteenth aspect, a computer-readable storage medium is provided, where the computer-readable storage medium stores one or more programs, the one or more programs include an instruction, and when a processor of the portable electronic device executes the instruction, the portable electronic device executes the notification outputting method according to the third aspect and various optional manners of the third aspect.

According to a seventeenth aspect, a portable electronic device is provided, where the portable electronic device includes one or more processors, a memory, a bus system, a transceiver, and one or more application programs, where the one or more processors, the memory, and the transceiver are connected by using the bus system, and the one or more application programs are stored in the memory, the one or more application programs include an instruction, and when the processor of the portable electronic device executes the instruction, the portable electronic device executes the notification outputting method according to the fourth aspect and various optional manners of the fourth aspect.

According to an eighteenth aspect, a computer-readable storage medium is provided, where the computer-readable storage medium stores one or more programs, the one or more programs include an instruction, and when a processor of the portable electronic device executes the instruction, the portable electronic device executes the notification outputting method according to the fourth aspect and various optional manners of the fourth aspect.

According to a nineteenth aspect, a portable electronic device is provided, where the portable electronic device includes one or more processors, a memory, a bus system, a transceiver, and one or more application programs, where the one or more processors, the memory, and the transceiver are connected by using the bus system, and the one or more application programs are stored in the memory, the one or more application programs include an instruction, and when the processor of the portable electronic device executes the instruction, the portable electronic device executes the notification outputting method according to the fifth aspect and various optional manners of the fifth aspect.

According to a twentieth aspect, a computer-readable storage medium is provided, where the computer-readable storage medium stores one or more programs, the one or more programs include an instruction, and when a processor of the portable electronic device executes the instruction, the portable electronic device executes the notification outputting method according to the fifth aspect and various optional manners of the fifth aspect.

For a specific description of the portable electronic device, reference may be made to the related descriptions of the notification outputting method. Details are not described herein again.

The portable electronic device can increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

For specific technical solutions used by the portable electronic device to achieve the foregoing technical effects and an analysis on how to use the specific technical solutions to achieve the foregoing technical effects, reference may be made to the related descriptions of the notification outputting method. Details are not described herein again.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention.

DETAILED DESCRIPTION OF ILLUSTRATIVE EMBODIMENTS

In the specification and drawings of the present invention, the terms "first", "second", and so on are intended to distinguish between different objects but do not indicate a particular order of the objects. For example, a first message and a second message are used to distinguish different messages, but are not used to indicate a particular order of the messages.

In the descriptions of the present invention, unless otherwise specified, "multiple" means at least two. For example, multiple processors mean at least two processors.

In addition, the terms "including", "comprising", or any other variant thereof mentioned in descriptions of the present invention are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In the following description, specific details such as a particular system structure, an interface, and a technology are set forth in an illustrative but not a restrictive sense to make a thorough understanding of the present invention. However, a person skilled in the art should know that the present invention may be implemented in other embodiments without these specific details. In other cases, detailed descriptions of well-known apparatuses, circuits, and methods are omitted, so that the present invention is described without being obscured by unnecessary details.

The following describes the technical solutions in the embodiments of the present invention in details with reference to the accompanying drawings in the embodiments of the present invention. Apparently, the described embodiments are merely some but not all of the embodiments of the present invention.

Optionally, in the embodiments of the present invention, the portable electronic device may be a portable electronic device such as a smartphone or a wearable device. This is not specifically limited in the present invention.

Figure 1:
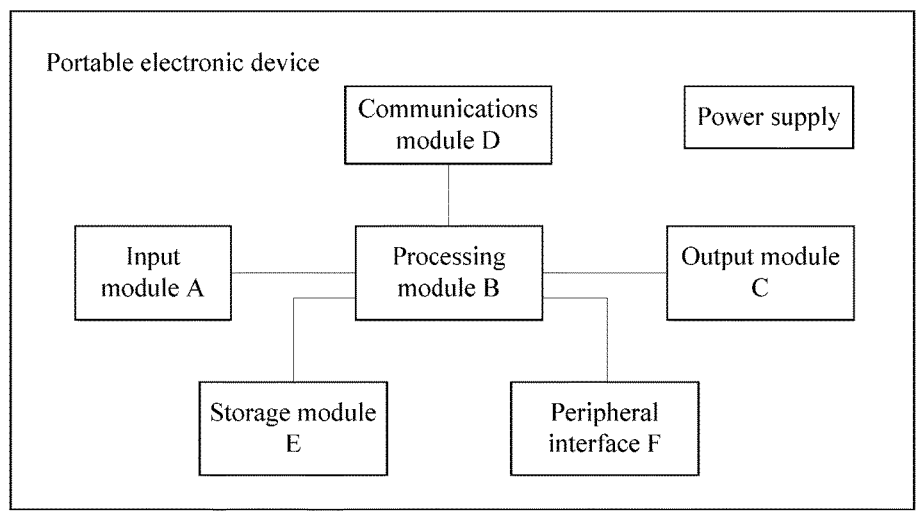
FIG. 1 is a schematic structural diagram of an example of a portable electronic device according to an embodiment of the present invention.

Referring to FIG. 1, FIG. 1 is a schematic structural diagram of an example of a portable electronic device according to an embodiment of the present invention. As shown in FIG. 1, the portable electronic device may include components such as an input module A, a processing module B, an output module C, a communications module D, a storage module E, a peripheral interface F, and a power supply. These components communicate with each other by using one or more buses. A person skilled in the art can understand that a structure of the portable electronic device shown in the figure does not constitute any limitation on the present invention. The structure may be a bus-shaped structure or a star structure, or may include components more or fewer than those shown in the figure, a combination of some components, or components disposed differently.

The input module A is configured to implement interaction between a user and the portable electronic device and/or enter information to the portable electronic device. For example, the input module A may receive digital or character information entered by the user, to generate signal input related to user settings or function control. In a specific implementation of the present invention, the input module A may be a touch panel or may be another man-machine interface such as a substantive input key or a microphone, or may be another external apparatus for collecting information such as a camera. For example, the portable electronic device in this embodiment of the present invention may receive a trigger operation of the user by using the input module A and set a geo-fence. In other implementations of the present invention, the input module A may alternatively be various types of sensing components, such as a Hall component, a gravity sensor, a tri-axis accelerometer, a gyroscope, an electronic compass, a proximity sensor, or a fingerprint sensor.

The processing module B is a control center of the portable electronic device, is connected to various parts of the entire portable electronic device by using interfaces and lines, and executes various functions of the portable electronic device and/or data processing by running or executing a software program and/or a module that are/is stored in the storage module E and by invoking data stored in the storage module E. The processing module B may include an integrated circuit (IC), for example, may include a single packaged IC or may include multiple packaged ICs having a same function or different functions. For example, the processing module B may include only a central processing unit (CPU), or may be a combination of a GPU (GPU), a digital signal processor (DSP), and a control chip (for example, a baseband chip). In the implementation of the present invention, the CPU may be a single computing core, or may include multiple computing cores.

The communications module D is configured to establish a communication channel, so that the portable electronic device performs voice communication, text communication, and data communication with a remote electronic device or server by using the communication channel. The communications module D may include a communications module such as a wireless local area network (WLAN) module, a Bluetooth module, and a baseband (Base Band) module, and include a radio frequency (RF) circuit corresponding to the communications module. The communications module D is configured to perform wireless local area network communication, Bluetooth communication, infrared communication, and/or communication in a cellular communications system. For example, the portable electronic device in this embodiment of the present invention may communicate with a satellite communications system by using the communications module D of the portable electronic device, and obtain information about a current location of the portable electronic device.

The output module C includes but is not limited to an image output module and a sound output module. The image output module C is configured to output a text, a picture, and/or a video. The image output module C may include a display panel, or the image output module C may include a reflective display. The image output module C may include a single display or multiple displays with different sizes. In a specific implementation of the present invention, the touch panel used as the input module A may also be used as the display panel of the output module C. For example, after detecting a gesture operation performed on or near the touch panel, the touch panel transmits information about the gesture operation to the processing module to determine a touch event type, and then the processing module provides corresponding visual output on the display panel according to the touch event type. For example, the portable electronic device in this embodiment of the present invention may display an electronic map by using the display panel of the portable electronic device, and display the geo-fence set by the portable electronic device on the electronic map. In addition, the portable electronic device in this embodiment of the present invention may alternatively output a notification by means of image output or sound output, to remind a user that the electronic device is located within the specific geo-fence. In FIG. 1, the input module A and the output module C are used as two independent components to implement input and output functions of the portable electronic device. However, in some embodiments, the touch panel and the display panel may be integrated to implement the input and output functions of the portable electronic device.

The storage module E may be configured to store a software program and a module, and the processing module executes various function applications of the portable electronic device and data processing by running the software program and the module that are stored in the storage module E. The storage module E mainly includes a program storage area and a data storage area. The program storage area may be a non-transitory computer readable medium and may store an operating system, and an application program required by at least one function, such as a geo-fence reminder program in this embodiment of the present invention. The data storage area may store data created according to the use of the portable electronic device (such as audio data, a phone book, and a geo-fence). In a specific implementation of the present invention, the storage module E may include a volatile memory, for example, a nonvolatile dynamic random access memory (NVRAM), a phase change random access memory (PRAM), and a magnetoresistive random access memory (MRAM), and may further include a nonvolatile memory, for example, at least one magnetic disk storage component, an electrically erasable programmable read-only memory (EEPROM), and a flash memory component such as a NOR flash memory or a NAND flash memory. The nonvolatile memory stores the operating system on which the processing module runs and the application program that is executed by the processing module. The processing module loads, from the nonvolatile memory, the running program and the data to a memory, and stores digital content into a large-capacity storage apparatus. The operating system includes various components and/or drivers that are used for control and management of a conventional system task such as memory management, storage device control, and power management, and that are conducive to communication between software and hardware. In the implementation of the present invention, the operating system may be an Android (Android) system of Google Inc., an iOS system developed by Apple Inc., a Windows system/a Windows Phone system, or the like developed by Microsoft Corporation, or an embedded operating system such as VxWorks.

The application program includes any application installed on the portable electronic device, including but not limited to a browser, a geo-fencing application, and an email.

The power supply is configured to supply power to different components of the portable electronic device, so as to maintain running of the different components. Generally, the power supply may be an embedded battery, for example, a common lithium-ion battery or a NiMH battery, or may be an external power supply that directly supplies power to the portable electronic device, for example, an AC adapter. In some implementations of the present invention, the power supply may have more extensive definitions. For example, the power supply may further include a power management system, a charging system, a power supply failure detection circuit, a power supply converter or inverter, a power supply status indicator (such as a light emitting diode), and any other component related to electric energy generation, management, and distribution of the portable electronic device.

Figure 2:
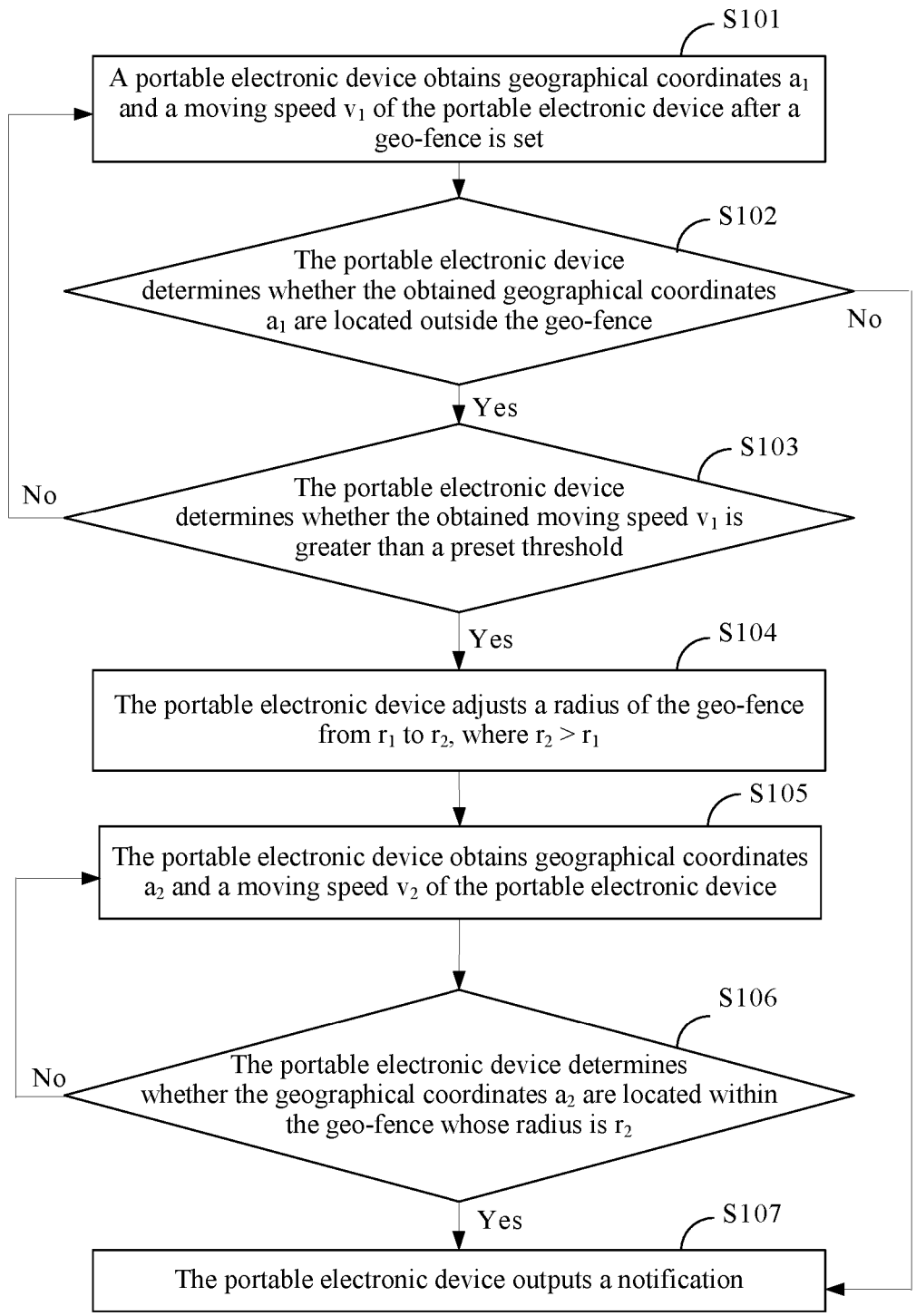
FIG. 2 is a flowchart of a notification outputting method according to an embodiment of the present invention.

An embodiment of the present invention provides a notification outputting method. The notification outputting method may be applied to the portable electronic device shown in FIG. 1. As shown in FIG. 2, the notification outputting method includes the following steps.

S101. The portable electronic device obtains geographical coordinates $a_1$ and a moving speed $v_1$ of the portable electronic device after a geo-fence is set.

For example, the portable electronic device may receive a trigger of a user, and set a geo-fence in a location specified by the user. An initial radius of the geo-fence may be a fixed radius preconfigured on the portable electronic device, or may be a radius set by the user.

Figure 3:
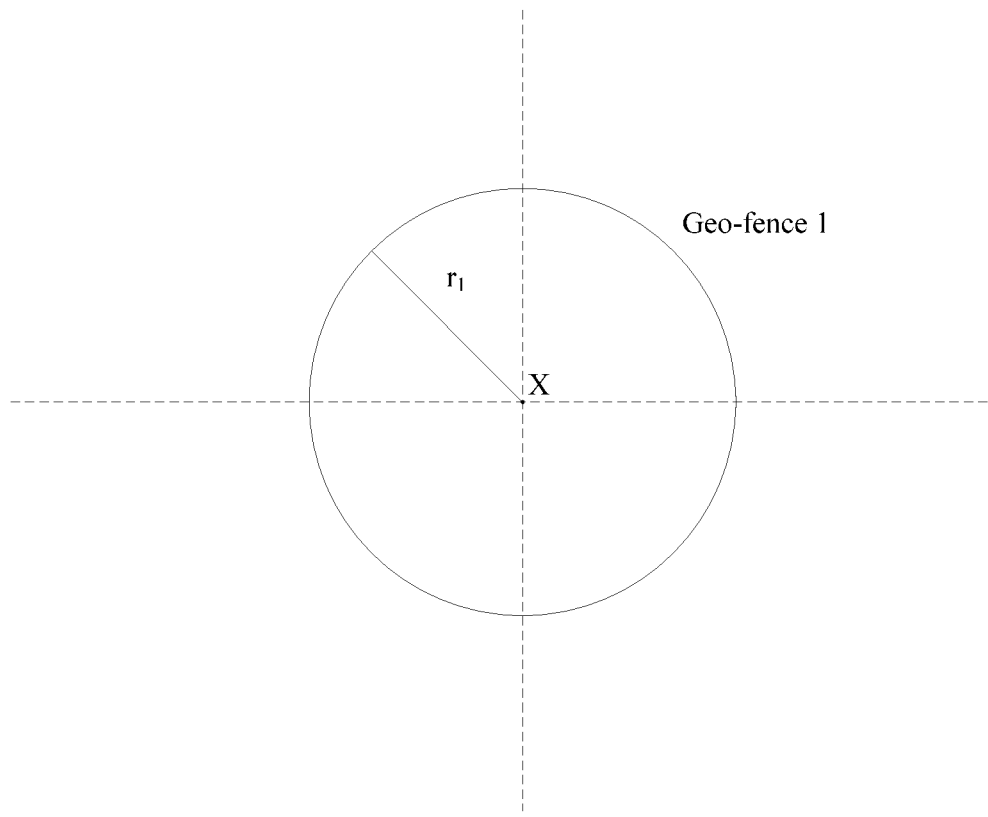
FIG. 3 is a schematic diagram of an example of a geo-fence according to an embodiment of the present invention.

For example, as shown in FIG. 3, the portable electronic device may set, in a location X, a geo-fence 1 whose initial radius is $r_1$ (a center point of the geo-fence 1 is in the location X).

It should be understood that, in a high-speed movement scenario, geographical coordinates of the portable electronic device change in real time, and a moving speed of the portable electronic device may also change. Therefore, the portable electronic device needs to periodically obtain the geographical coordinates and the moving speed of the portable electronic device. An initial period for obtaining, by the portable electronic device, geographical coordinates and a moving speed of the portable electronic device may be $t_1$. $t_1$ may be fixed duration preconfigured on the portable electronic device, or may be duration set by a user.

The geographical coordinates in this embodiment of the present invention may be Global Positioning System (GPS) coordinates. Certainly, the geographical coordinates in this embodiment of the present invention may alternatively be coordinates obtained by using another positioning technology. For example, any of the following positioning technologies may alternatively be used to position the geographical coordinates: a global navigation satellite system (GNSS), a positioning technology based on a mobile communications network base station, a positioning technology based on a Wi-Fi signal, or the like. The GNSS generally refers to all navigation satellite systems, including a global navigation satellite system, a regional navigation satellite system, and an enhanced navigation satellite system, such as the Unites States GPS, the Russian Glonass, the European Union's Galileo, the Chinese Beidou Navigation Satellite System, and related enhanced systems. The positioning technology based on a mobile communications network base station is also referred to as a cell identity (Cell ID)-based positioning technology.

In this embodiment of the present invention, the portable electronic device may periodically obtain geographical coordinates and a moving speed of the portable electronic device synchronously.

Optionally, a period for periodically obtaining, by the portable electronic device, geographical coordinates of the portable electronic device may alternatively be different from a period for periodically obtaining a moving speed of the portable electronic device.

For example, at intervals of first preset duration, the portable electronic device may position the portable electronic device within second preset duration (the first preset duration is greater than the second preset duration) at preset high frequency (the high frequency is greater than a positioning frequency corresponding to the period t); calculate an average moving speed of the portable electronic device within the second preset duration; adjust the positioning frequency of the portable electronic device to a normal positioning frequency (that is, the positioning frequency corresponding to the period $t_1$) after the second preset duration; and position the portable electronic device at the normal positioning frequency.

For a method for calculating, by the portable electronic device, a moving speed of the portable electronic device within the second preset duration, reference may be made to a related method for calculating a moving speed in this embodiment of the present invention. Details are not described herein.

It should be understood that, the portable electronic device in this embodiment of the present invention may use different technologies to obtain geographical coordinates and a moving speed of the portable electronic device. For example, the portable electronic device may use a GPS positioning technology to obtain the geographical coordinates of the portable electronic device, and use a positioning technology that is based on a mobile communications network base station to obtain the moving speed of the portable electronic device.

Certainly, the portable electronic device may alternatively use a speed obtaining module configured in the portable electronic device, to obtain the moving speed of the portable electronic device. That is, the portable electronic device may directly read the moving speed of the portable electronic device from the speed obtaining module. For example, if the portable electronic device is an electronic device having an Android system, the portable electronic device may directly obtain the moving speed of the portable electronic device by using a getSpeed( ) interface in the Android system.

S102. The portable electronic device determines whether the obtained geographical coordinates $a_1$ are located outside the geo-fence.

For example, the portable electronic device determines whether the geographical coordinates $a_1$ obtained by the portable electronic device are located outside the geo-fence 1 whose center point is the location X and whose radius is $r_1$, as shown in FIG. 3.

It should be noted that, for a specific method for determining, by the portable electronic device, whether the obtained geographical coordinates $a_1$ are located outside the geo-fence whose radius is $r_1$, reference may be made to a related prior-art method for determining whether geographical coordinates is located within a geographical area. Details are not described in this embodiment herein.

In addition, the geo-fence in this embodiment of the present invention includes but is not limited to the circular geo-fence shown in FIG. 3. A shape of the geo-fence in this embodiment of the present invention may alternatively be an oval, a rectangular, or any other geometric shape. The radius of the geo-fence in this embodiment of the present invention may be understood not only as a radius of the circular geo-fence, but also as a minimum distance between a center point of a geo-fence in another shape and a boundary of the geo-fence, for example, a radius of an oval geo-fence is a radius of an inscribed circle of the oval geo-fence.

Specifically, if the geographical coordinates $a_1$ obtained by the portable electronic device are located outside the geo-fence, S103 continues to be performed; if the geographical coordinates $a_1$ obtained by the portable electronic device are located within the geo-fence, S107 continues to be performed.

S103. The portable electronic device determines whether the obtained moving speed $v_1$ is greater than a preset threshold.

Optionally, the preset threshold in this embodiment may be a preset fixed speed threshold.

Preferably, the preset threshold in this embodiment may be specifically an upper speed limit $v_{12}$ within a speed range $[v_{11}, v_{12}]$. $[v_{11}, v_{12}]$ is a preconfigured speed range corresponding to $r_1$.

In this embodiment of the present invention, the portable electronic device may preconfigure a correspondence between a speed range and a radius of the geo-fence.

It should be understood that, because of a relatively small radius of the geo-fence, the portable electronic device does not collect geographical location coordinates within the geo-fence when the portable electronic device moves fast. To avoid such an issue, in this embodiment of the present invention, a specific limitation on a speed range (for example, $[v_{11}, v_{12}]$) corresponding to a radius (for example, $r_1$) of the geo-fence may be: If the period for obtaining geographical coordinates of the portable electronic device (the period is $t_1$) keeps unchanged, the portable electronic device at least needs to collect geographical coordinates of the portable electronic device once within the geo-fence during a process in which the portable electronic device approaches and goes through the geo-fence at an upper speed limit (for example, $v_{12}$) within the speed range.

Figure 4:
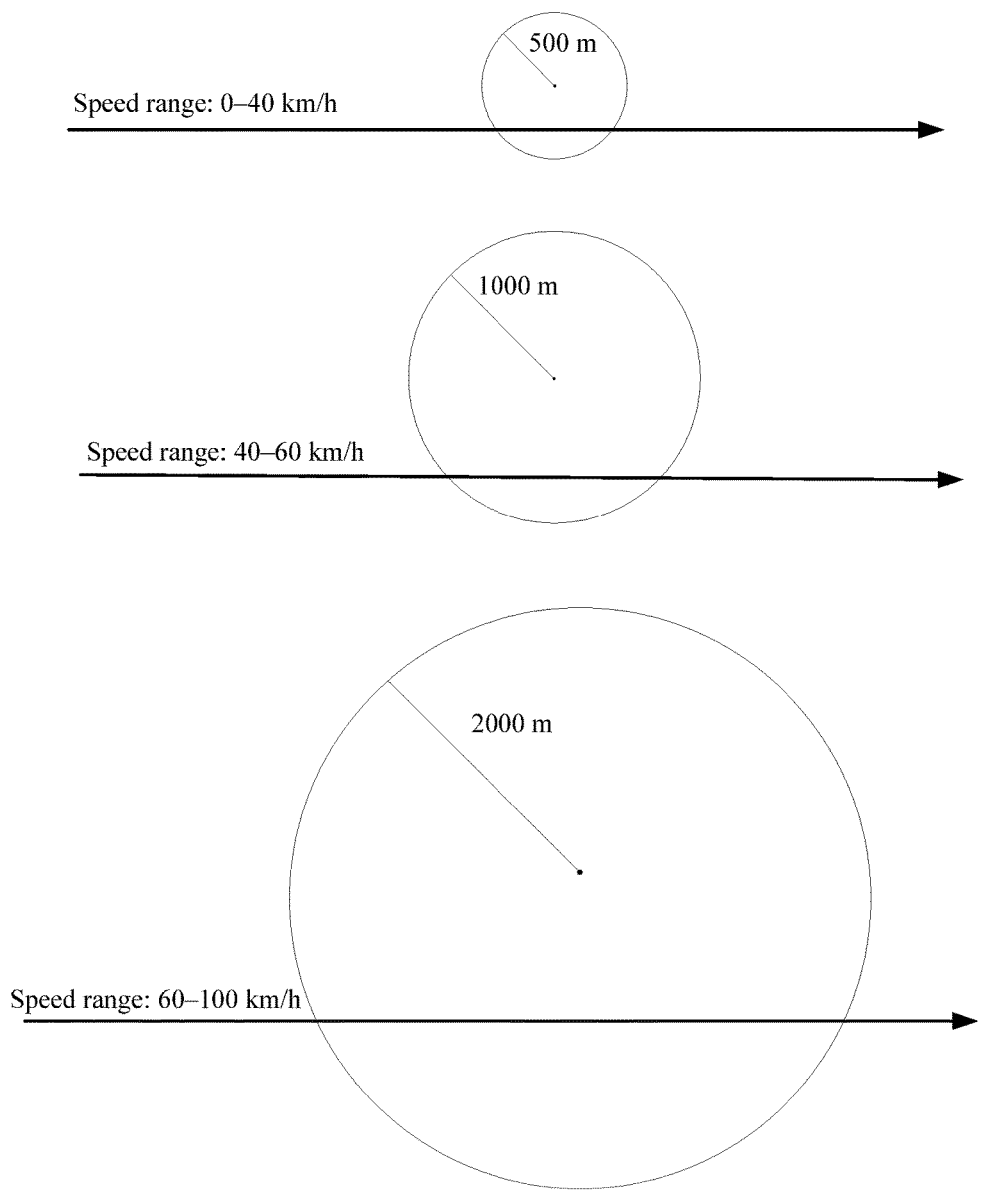
FIG. 4 is a schematic diagram of an example of another geo-fence according to an embodiment of the present invention.

As shown in FIG. 4, when a radius of the geo-fence is 500 meters (m), a speed range corresponding to the radius may be [0, 40], that is, 0-40 kilometers per hour (km/h). When a radius of the geo-fence is 1000 m, a speed range corresponding to the radius may be [40, 60], that is, 40-60 km/h. When a radius of the geo-fence is 2000 m, a speed range corresponding to the radius may be [60, 100], that is, 60-100 km/h.

For example, in this embodiment of the present invention, the correspondence may be configured on the portable electronic device in a tabular form. As listed in Table 1, Table 1 is a table of a correspondence between a radius and a speed range according to this embodiment of the present invention.

TABLE 1

Table of a correspondence between a radius and a speed range

| Current radius of a geo-fence | Speed range |
|---|---|
| 500 m | 0-40 km/h |
| 1000 m | 40-60 km/h |
| ... | ... |
| 2000 m | 60-100 km/h |

It should be noted that, in this embodiment of the present invention, the correspondence between a radius of a geo-fence and a speed range includes but is not limited to the relationship listed above, and another correspondence between a radius of a geo-fence and a speed range is not described herein.

Specifically, if the moving speed $v_1$ obtained by the portable electronic device is greater than the preset threshold, S104 continues to performed; if the moving speed $v_1$ obtained by the portable electronic device is less than or equal to the preset threshold, geographical coordinates and a moving speed of the portable electronic device are obtained.

S104. The portable electronic device adjusts a radius of the geo-fence from $r_1$ to $r_2$, where $r_2 > r_1$.

Figure 5:
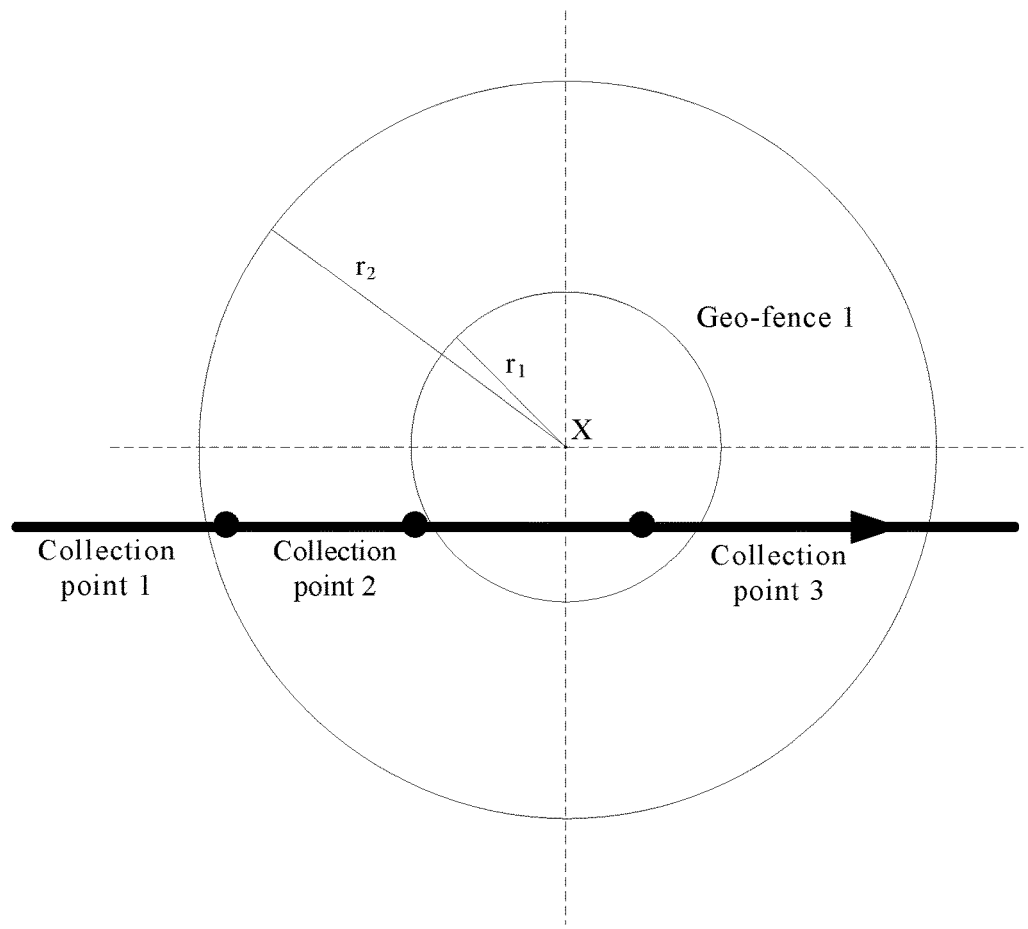
FIG. 5 is a schematic diagram of an example of another geo-fence according to an embodiment of the present invention.

For example, as shown in FIG. 5, the portable electronic device may adjust the radius of the geo-fence from $r_1$ to $r_2$, where $r_2 > r_1$. As shown in FIG. 5, a thick black line is used to indicate a moving route of the portable electronic device and a moving direction of the portable electronic device, and during a moving process, the portable electronic device may collect geographical coordinates and a moving speed once within the geo-fence whose radius is $r_1$ (that is, collect geographical coordinates and a moving speed once at a collection point 3). In comparison, as shown in FIG. 5, after the portable electronic device adjusts the radius of the geo-fence from $r_1$ to $r_2$, during a moving process, the portable electronic device may collect the geographical coordinates and a moving speed at least three times within the geo-fence whose radius is $r_2$ (that is, collect geographical coordinates and a moving speed once separately at a collection point 1, a collection point 2, and the collection point 3).

Optionally, in an implementation of this embodiment, $r_2$ may be a preconfigured radius that has a mapping relationship with a speed range $[v_{21}, v_{22}]$ to which $v_1$ belongs, where $v_{21} \leq v_1 \leq v_{22}$.

It can be understood that, the radius $r_2$ that has a mapping relationship with the speed range $[v_{21}, v_{22}]$ to which $v_1$ belongs is greater than $r_1$. Therefore, the portable electronic device may increase the radius of the geo-fence when the obtained moving speed $v_1$ is greater than the upper speed limit $v_{12}$ within the speed range $[v_{11}, v_{12}]$ corresponding to the current radius $r_1$ of the geo-fence.

Based on the radius of the geo-fence and the speed range shown in FIG. 4 or listed in Table 1, Table 2 lists a table of a mapping relationship between a speed range and a radius according to this embodiment of the present invention.

TABLE 2

Table of a mapping relationship between a speed range and a radius

| Speed range | Adjusted radius of a geo-fence |
|---|---|
| 0-40 km/h | 800 m |
| 40-60 km/h | 1500 m |
| ... | ... |
| 60-100 km/h | 2300 m |

It should be noted that, in this embodiment of the present invention, the mapping relationship between a speed range and a radius includes but is not limited to the relationship listed above, and another mapping relationship between a speed range and a radius is not described herein.

It should be understood that, with reference to the data in Table 1 and Table 2, in this embodiment of the present invention, the correspondence between a radius of the geo-fence and a speed range and the mapping relationship between a speed range and a radius may alternatively be configured in a manner of a correspondence plus a mapping relationship, as listed in Table 3.

TABLE 3

| Current radius of a geo-fence | Correspondence | Speed range | Mapping | Adjusted radius of a geo-fence |
|---|---|---|---|---|
| 500 m | → | 0-40 km/h | → | 800 m |
| 1000 m | → | 40-60 km/h | → | 1500 m |
| . . . | → | . . . | → | . . . |
| 2000 m | → | 60-100 km/h | → | 2300 m |

Preferably, in another implementation of this embodiment, $r_2$ may be a product of the moving speed $v_1$ and the period $t_1$ that is used before the adjustment.

S105. The portable electronic device obtains geographical coordinates $a_2$ and a moving speed $v_2$ of the portable electronic device.

A method for obtaining, by the portable electronic device, the geographical coordinates $a_2$ and the moving speed $v_2$ of the portable electronic device is similar to the method for obtaining, by the portable electronic device, the geographical coordinates $a_1$ and the moving speed $v_1$. Details are not described herein again.

S106. The portable electronic device determines whether the geographical coordinates $a_2$ are located within the geo-fence whose radius is $r_2$.

Specifically, if the geographical coordinates $a_2$ obtained by the portable electronic device are located within the geo-fence whose radius is $r_2$, S107 continues to be performed. If the geographical coordinates $a_2$ obtained by the portable electronic device are located outside the geo-fence whose radius is $r_2$, geographical coordinates and a moving speed of the portable electronic device are obtained, and whether the obtained geographical coordinates are located within the geo-fence whose radius is $r_2$ is determined; and if the obtained geographical coordinates are located within the geo-fence whose radius is $r_2$, S107 continues to be performed.

S107. The portable electronic device outputs a notification.

It should be noted that, in this embodiment of the present invention, the portable electronic device may receive the trigger of the user, set multiple geo-fences in different geographical locations, and according to a sequence of distances between the portable electronic device and the geographical locations of the multiple geo-fences in ascending order, sequentially execute the notification outputting method provided in any embodiment of the present invention.

In addition, it should be emphasized that, the method provided in this embodiment of the present invention is applied to a process in which the portable electronic device moves towards a geo-fence (that is, a distance between the portable electronic device and a center point of the geo-fence gradually decreases).

It should be understood that, when the geographical coordinates $a_1$ of the portable electronic device are located outside the geo-fence, it indicates that the portable electronic device approaches but does not reach the geo-fence. In this case, if the moving speed $v_1$ of the portable electronic device is greater than the preset threshold, it indicates that the portable electronic device fast goes through the geo-fence. The portable electronic device may not collect geographical location coordinates within the geo-fence because of a relatively small radius of the geo-fence, and does not give a reminder about the geo-fence to a user.

According to this solution, the radius of the geo-fence may be increased when the geographical coordinates $a_1$ of the portable electronic device are located outside the geo-fence and the moving speed $v_1$ of the portable electronic device is greater than the preset threshold, that is, when the portable electronic device approaches but does not reach the geo-fence and the portable electronic device will fast go through the geo-fence. On the premise that frequency of collecting geographical location coordinates keeps unchanged, increasing the radius of the geo-fence can increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

Further, the method for obtaining, by the portable electronic device, a moving speed of the portable electronic device in S101 in this embodiment of the present invention may include: dividing a distance between geographical coordinates obtained at two times by a time difference between obtaining the geographical coordinates at two times, to obtain a moving speed of the portable electronic device.

For example, assuming that the portable electronic device obtains geographical coordinates $A_0$ for a previous time and obtains geographical coordinates $A_1$ for this time, a distance between the geographical coordinates $A_0$ obtained for the previous time and the geographical coordinates $A_1$ obtained for this time and a time difference between a moment when the geographical coordinates $A_0$ is obtained for the previous time and a moment when the geographical coordinates $A_1$ is obtained for this time may be calculated, and then a quotient obtained when the distance is divided by the time difference is calculated, to obtain the moving speed of the portable electronic device.

Preferably, in this embodiment of the present invention, geographical coordinates and a moving speed of the portable electronic device may be periodically obtained according to the fixed period $t_1$, or the period for obtaining geographical coordinates and a moving speed of the portable electronic device may be dynamically adjusted.

Specifically, the portable electronic device may adjust the period for obtaining, by the portable electronic device, geographical coordinates and a moving speed of the portable electronic device from $t_1$ to $t_2$ when an increasing amplitude of the moving speed of the portable electronic device is greater than a preset amplitude threshold, where $t_2 < t_1$.

For example, $t_2$ may be determined in a specific manner, or $t_2$ may be specifically a preconfigured radius that has a mapping relationship with the speed range $[v_{21}, v_{22}]$ to which $v_1$ belongs. In this embodiment of the present invention, for a method for configuring the mapping relationship between $t_2$ and the speed range $[v_{21}, v_{22}]$ to which $v_1$ belongs, reference may be made to the foregoing method for configuring the mapping relationship between a speed range and a radius. Details are not described herein again.

It should be understood that, the portable electronic device may periodically obtain, according to the period $t_2$, geographical coordinates and a moving speed of the portable electronic device after adjusting the period for obtaining, by the portable electronic device, geographical coordinates and a moving speed of the portable electronic device from $t_1$ to $t_2$, and determine whether the obtained geographical coordinates are located outside the geo-fence whose radius is $r_1$.

According to the notification outputting method provided in this embodiment of the present invention, the radius of the geo-fence may be increased, and the period for obtaining geographical coordinates and a moving speed of the portable electronic device may be decreased when the increasing amplitude of the moving speed of the portable electronic device is greater than the preset amplitude threshold. In this way, frequency of collecting geographical location coordinates can be increased. Higher frequency of collecting geographical location coordinates indicates a higher possibility that the portable electronic device collects geographical location coordinates within the geo-fence. This can further increase a possibility that a geo-fencing application works properly.

Figure 6:
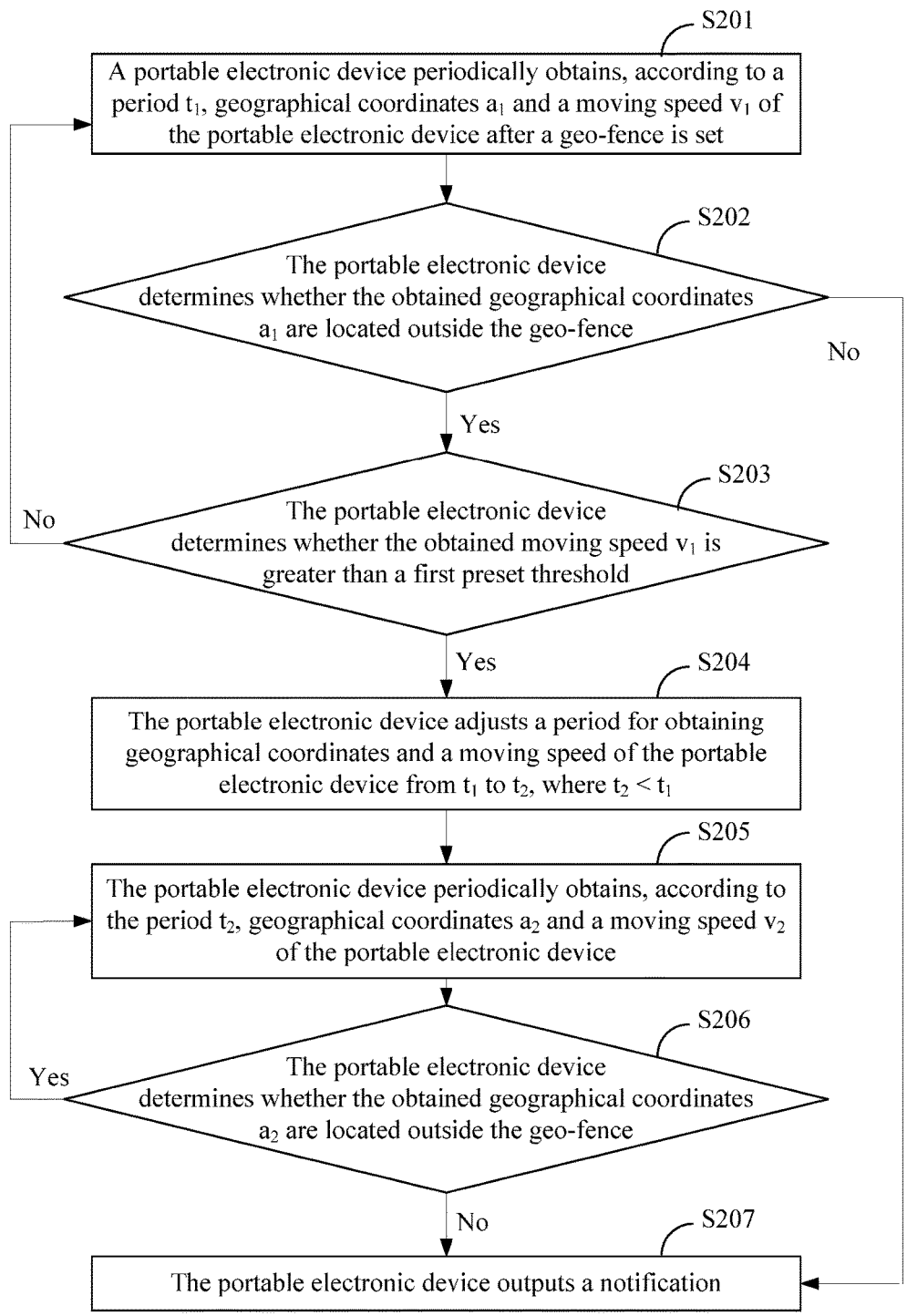
FIG. 6 is a flowchart of another notification outputting method according to an embodiment of the present invention.

An embodiment of the present invention provides a notification outputting method. The notification outputting method may be applied to the portable electronic device shown in FIG. 1. As shown in FIG. 6, the notification outputting method includes the following steps.

S201. The portable electronic device periodically obtains, according to a period $t_1$, geographical coordinates $a_1$ and a moving speed $v_1$ of the portable electronic device after a geo-fence is set.

It should be noted that, in this embodiment, for a specific method for obtaining, by the portable electronic device, a moving speed of the portable electronic device, reference may be made to the related description in the foregoing embodiment. Details are not described in this embodiment herein again.

S202. The portable electronic device determines whether the obtained geographical coordinates $a_1$ are located outside the geo-fence.

If the geographical coordinates $a_1$ obtained by the portable electronic device are located outside the geo-fence, S203 continues to be performed; if the geographical coordinates $a_1$ obtained by the portable electronic device are located within the geo-fence, S207 continues to be performed.

S203. The portable electronic device determines whether the obtained moving speed $v_1$ is greater than a first preset threshold.

For the first preset threshold in this embodiment, reference may be made to the related description of the preset threshold in the foregoing embodiment. Details are not described herein again.

Specifically, if the moving speed $v_1$ obtained by the portable electronic device is greater than the first preset threshold, S204 continues to performed; if the moving speed $v_1$ obtained by the portable electronic device is less than or equal to the first preset threshold, geographical coordinates and a moving speed of the portable electronic device are obtained.

S204. The portable electronic device adjusts the period for obtaining geographical coordinates and a moving speed of the portable electronic device from $t_1$ to $t_2$, where $t_2 < t_1$.

Figure 7:
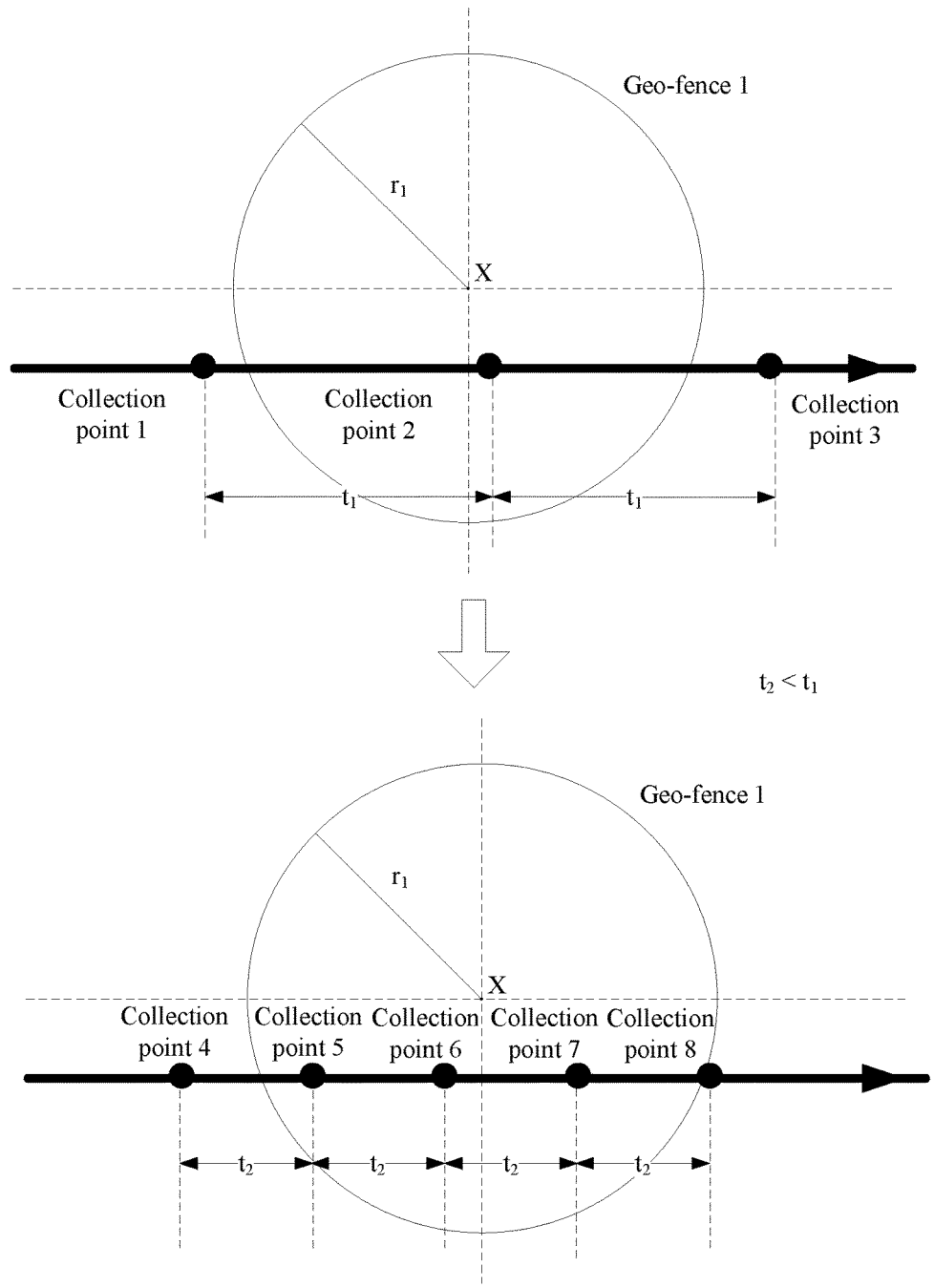
FIG. 7 is a schematic diagram of an example of another geo-fence according to an embodiment of the present invention.

For example, as shown in FIG. 7, after the portable electronic device adjusts the period for obtaining geographical coordinates and a moving speed of the portable electronic device from $t_1$ to $t_2$ (that is, decreases the period for obtaining geographical coordinates and a moving speed of the portable electronic device), frequency of collecting geographical coordinates and a moving speed by the portable electronic device correspondingly increases. As shown in FIG. 7, a thick black line is used to indicate a moving route of the portable electronic device and a moving direction of the portable electronic device. As shown in the upper figure of FIG. 7, when the period for obtaining, by the portable electronic device, geographical coordinates and a moving speed of the portable electronic device is $t_1$, the portable electronic device can collect geographical coordinates and a moving speed only once within the geo-fence; when the period for obtaining, by the portable electronic device, geographical coordinates and a moving speed of the portable electronic device is $t_2$, the portable electronic device can collect geographical coordinates and a moving speed only three times within the geo-fence.

Optionally, the period $t_2$ in this embodiment may be a preset fixed period less than $t_1$.

Preferably, the period $t_2$ in this embodiment may be a preconfigured period that has a mapping relationship with a speed range $[v_{21}, v_{22}]$ to which $v_1$ belongs, where $v_{21} \leq v_1 \leq v_{22}$.

In this embodiment of the present invention, for a method for configuring the mapping relationship between $t_2$ and the speed range $[v_{21}, v_{22}]$ to which $v_1$ belongs, reference may be made to the foregoing method for configuring the mapping relationship between a speed range and a radius. Details are not described herein again.

S205. The portable electronic device periodically obtains, according to the period $t_2$, geographical coordinates $a_2$ and a moving speed $v_2$ of the portable electronic device.

S206. The portable electronic device determines whether the obtained geographical coordinates $a_2$ are located outside the geo-fence.

If the geographical coordinates $a_2$ are located within the geo-fence, S207 continues to be performed; if the geographical coordinates $a_2$ are located outside the geo-fence, S205 is performed.

S207. The portable electronic device outputs a notification.

According to the notification outputting method provided in this embodiment of the present invention, the period for collecting geographical location coordinates by the portable electronic device may be decreased, that is, frequency of collecting geographical location coordinates by the portable electronic device may be increased, when the geographical coordinates $a_1$ of the portable electronic device are located outside the geo-fence and the moving speed $v_1$ of the portable electronic device is greater than the first preset threshold, that is, when the portable electronic device approaches but does not reach the geo-fence and the portable electronic device will fast go through the geo-fence. In this way, a possibility that the portable electronic device collects geographical location coordinates within the geo-fence can be increased, so that a possibility that the portable electronic device detects that the portable electronic device is located within the geo-fence can be increased, thereby increasing a possibility that a geo-fencing application works properly.

Further, after S205, the method in this embodiment of the present invention may further include S208.

S208. The portable electronic device adjusts a radius of the geo-fence from $r_1$ to $r_2$ when the geographical coordinates $a_2$ are located outside the geo-fence and the moving speed $v_2$ is greater than the first preset threshold or a second preset threshold, where $r_2 > r_1$.

$r_1$ is the unadjusted radius of the geo-fence, and the second preset threshold is greater than the first preset threshold.

Optionally, $r_2$ in this embodiment may be a preconfigured radius that has a mapping relationship with a speed range $[v_{31}, v_{32}]$ to which the moving speed $v_2$ belongs, where $v_{31} \leq v_2 \leq v_{32}$.

Preferably, $r_2$ in this embodiment may be a product of the moving speed $v_2$ and the period $t_2$.

According to the notification outputting method provided in this embodiment of the present invention, the period for collecting geographical location coordinates by the portable electronic device may be decreased, that is, frequency of collecting geographical location coordinates by the portable electronic device may be increased, and the radius of the geo-fence may be increased. In this way, a possibility that the portable electronic device collects geographical location coordinates within the geo-fence can be increased, so that a possibility that the portable electronic device detects that the portable electronic device is located within the geo-fence can be increased, thereby increasing a possibility that a geo-fencing application works properly.

Figure 8A:
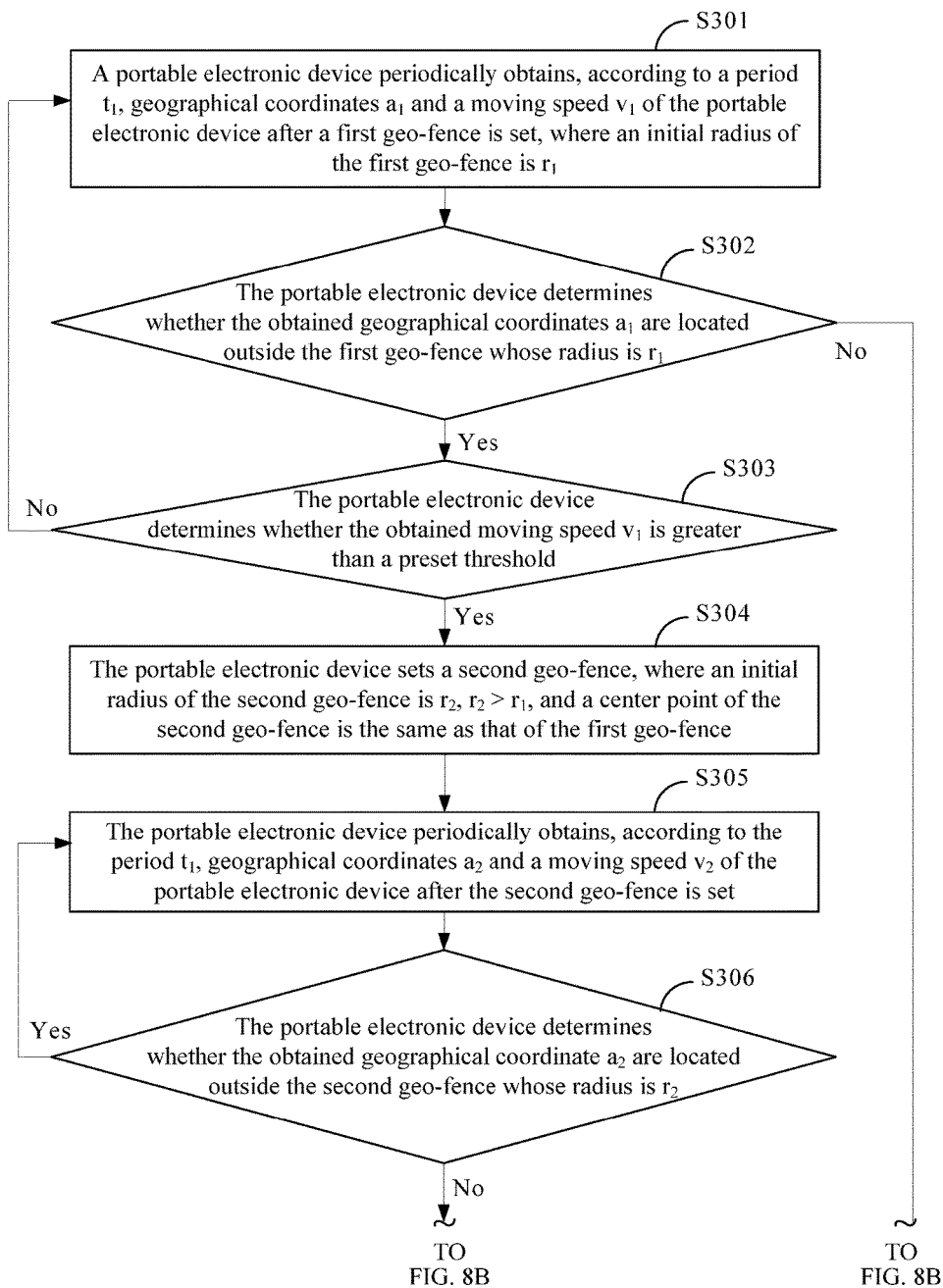
FIG. 8A and FIG. 8B are a flowchart of another notification outputting method according to an embodiment of the present invention
Figure 8B:
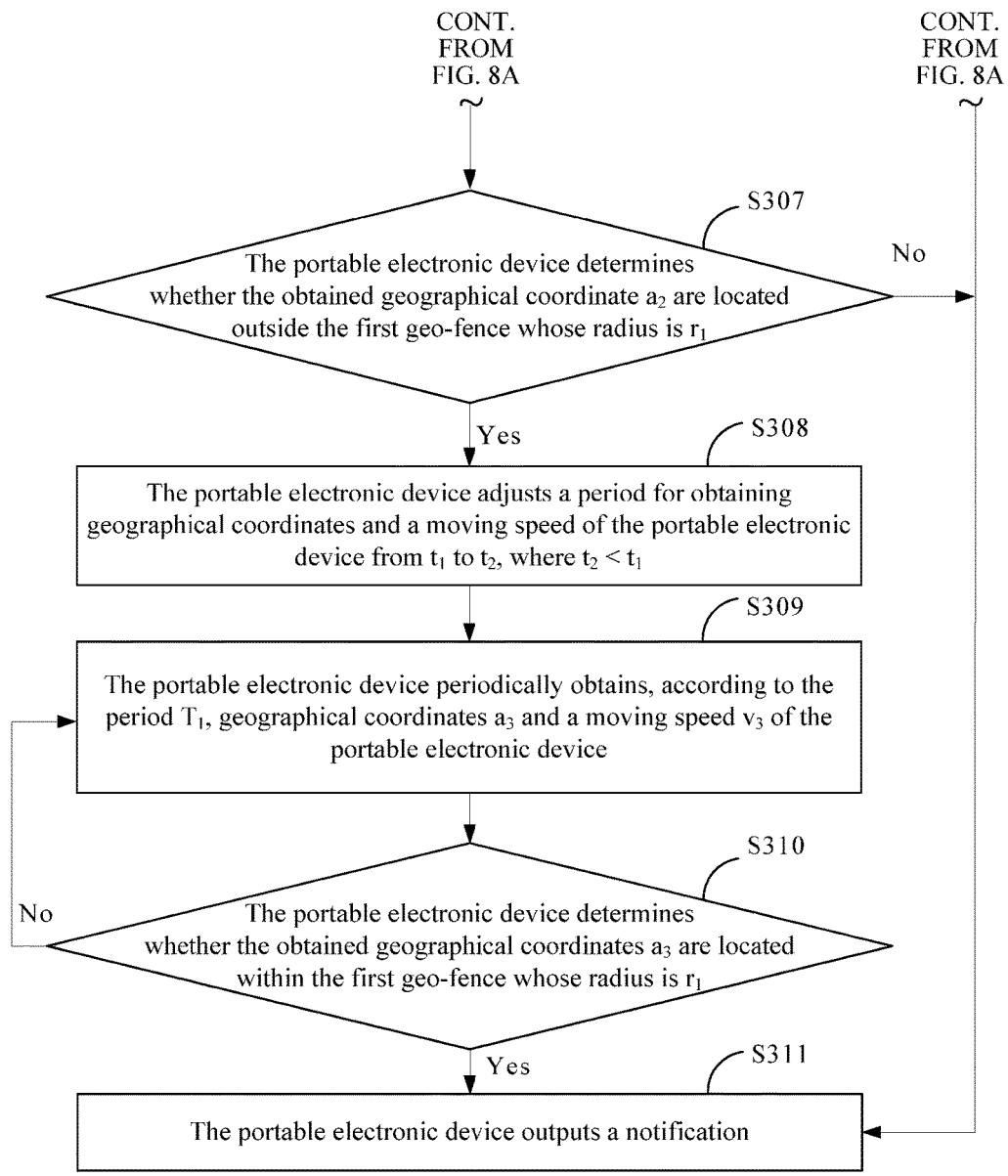

An embodiment of the present invention provides a notification outputting method. The notification outputting method may be applied to the portable electronic device shown in FIG. 1. As shown in FIG. 8A and FIG. 8B, the notification outputting method includes the following steps.

S301. The portable electronic device periodically obtains, according to a period $t_1$, geographical coordinates $a_1$ and a moving speed $v_1$ of the portable electronic device after a first geo-fence is set, where an initial radius of the first geo-fence is $r_1$.

Figure 9:
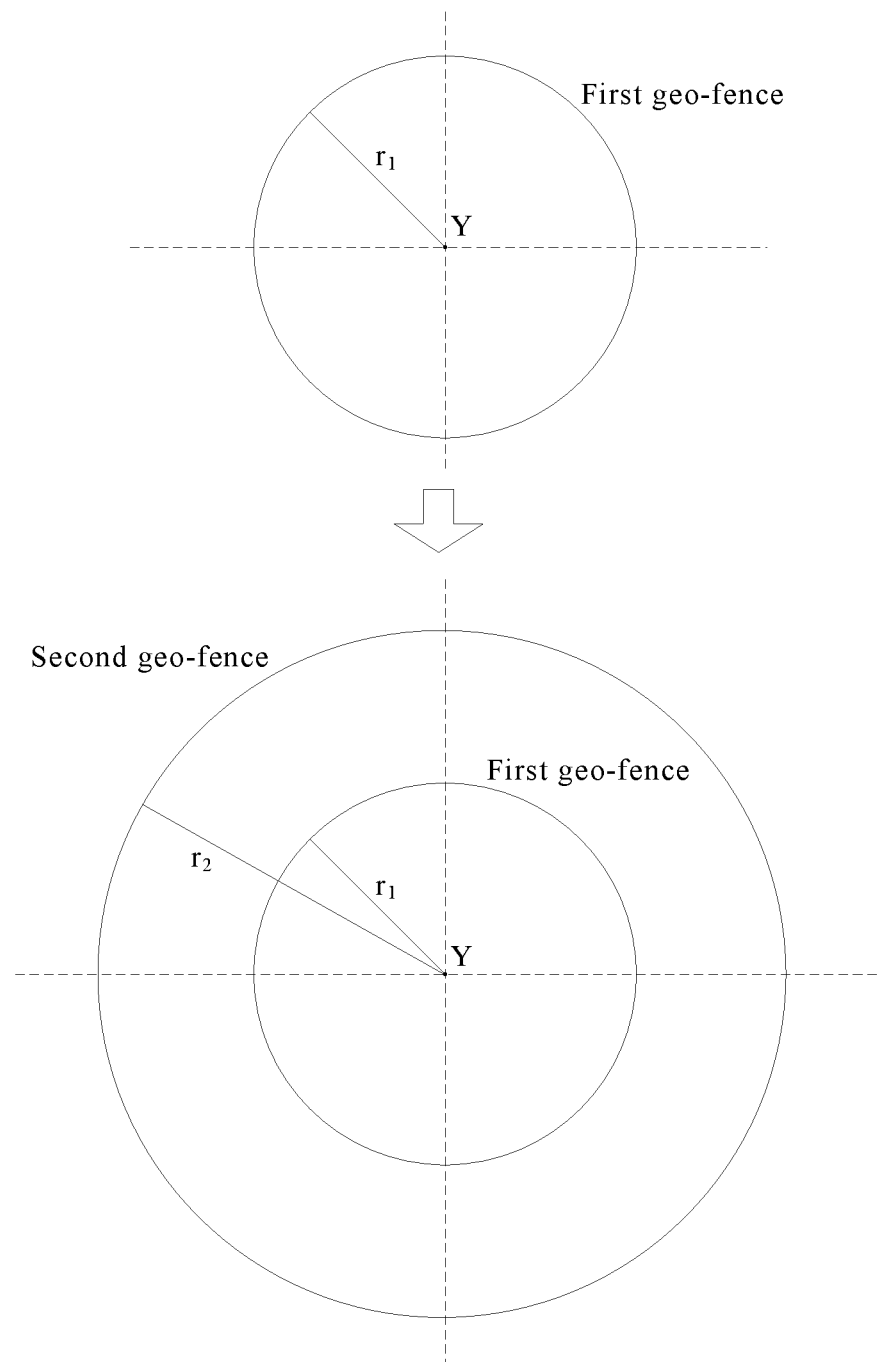
FIG. 9 is a schematic diagram of an example of another geo-fence according to an embodiment of the present invention.

As shown in FIG. 9, the portable electronic device may set, in a location Y, a first geo-fence whose initial radius is $r_1$ (a center point of the first geo-fence is in the location Y). For a method for setting the first geo-fence by the portable electronic device, reference may be made to the foregoing related method for setting the geo-fence by the portable electronic device. Details are not described herein again.

It should be noted that, in this embodiment, for a specific method for obtaining, by the portable electronic device, a moving speed of the portable electronic device, reference may be made to the related descriptions in the foregoing embodiments. Details are not described in this embodiment herein again.

S302. The portable electronic device determines whether the obtained geographical coordinates $a_1$ are located outside the first geo-fence whose radius is $r_1$.

Specifically, if the geographical coordinates $a_1$ of the portable electronic device are located outside the first geo-fence whose radius is $r_1$, S303 continues to be performed; if the geographical coordinates $a_1$ of the portable electronic device are located within the first geo-fence whose radius is $r_1$, S310 continues to be performed.

S303. The portable electronic device determines whether the obtained moving speed $v_1$ is greater than a preset threshold.

For example, the preset threshold in this embodiment may be specifically an upper speed limit $v_{12}$ within a speed range $[v_{11}, v_{12}]$. $[v_{11}, v_{12}]$ is a preconfigured speed range corresponding to $r_1$. For a manner in which $r_1$ is corresponding to $[v_{11}, v_{12}]$, reference may be made to the foregoing related descriptions in the embodiments of the present invention. Details are not described herein again.

Specifically, if the moving speed $v_1$ of the portable electronic device is greater than the preset threshold, S304 continues to performed; if the moving speed $v_1$ obtained by the portable electronic device is less than the preset threshold, geographical coordinates and a moving speed of the portable electronic device are obtained.

S304. The portable electronic device sets a second geo-fence, where an initial radius of the second geo-fence is $r_2$, $r_2 > r_1$, and a center point of the second geo-fence is the same as that of the first geo-fence.

For example, as shown in FIG. 9, based on the first geo-fence shown in FIG. 9, the portable electronic device may set a second geo-fence whose radius is $r_2$ ($r_2 > r_1$) and whose center point is the location Y, that is, the center point of the first geo-fence shown in FIG. 9.

Preferably, $r_2 \geq v_1 \times t_1 + r_1$. The portable electronic device at least collects geographical location coordinates once within the second geo-fence when the radius of the second geo-fence is $r_2 \geq v_1 \times t_1 + r_1$. In this way, the period for obtaining geographical coordinates and a moving speed of the portable electronic device can be definitely adjusted, so that a possibility that the portable electronic device detects that the portable electronic device is located within the first geo-fence can be definitely increased, thereby definitely increasing a possibility that a geo-fencing application works properly.

S305. The portable electronic device periodically obtains, according to the period $t_1$, geographical coordinates $a_2$ and a moving speed $v_2$ of the portable electronic device after the second geo-fence is set.

S306. The portable electronic device determines whether the obtained geographical coordinates $a_2$ are located outside the second geo-fence whose radius is $r_2$.

Specifically, if the geographical coordinates $a_2$ of the portable electronic device are located within the second geo-fence whose radius is $r_2$, S307 continues to be performed; if the geographical coordinates $a_2$ of the portable electronic device are located outside the second geo-fence whose radius is $r_2$, geographical coordinates of the portable electronic device are obtained.

S307. The portable electronic device determines whether the obtained geographical coordinates $a_2$ are located outside the first geo-fence whose radius is $r_1$.

Specifically, if the geographical coordinates $a_2$ of the portable electronic device are located outside the first geo-fence whose radius is $r_1$, S308 continues to be performed; if the geographical coordinates $a_2$ of the portable electronic device are located within the first geo-fence whose radius is $r_1$, S311 continues to be performed.

S308. The portable electronic device adjusts the period for obtaining geographical coordinates and a moving speed of the portable electronic device from $t_1$ to $t_2$, where $t_2 < t_1$.

For example, the period $t_2$ in this embodiment may be specifically a preconfigured period that has a mapping relationship with a speed range $[v_{21}, v_{22}]$ to which $v_1$ belongs, where $v_{21} \leq v_1 \leq v_{22}$.

S309. The portable electronic device periodically obtains, according to a period $T_1$, geographical coordinates $a_3$ and a moving speed $v_3$ of the portable electronic device.

S310. The portable electronic device determines whether the obtained geographical coordinates $a_3$ are located within the first geo-fence whose radius is $r_1$.

Specifically, if the geographical coordinates $a_3$ obtained by the portable electronic device are located within the first geo-fence whose radius is $r_1$, S311 continues to be performed; if the geographical coordinates $a_3$ obtained by the portable electronic device are located outside the first geo-fence whose radius is $r_1$, geographical coordinates and a moving speed of the portable electronic device may be obtained, or whether the obtained moving speed $v_3$ is greater than the preset threshold may be further determined. If the obtained moving speed $v_3$ is greater than the preset threshold, the radius of the first geo-fence is increased. For a method for adjusting the radius of the first geo-fence by the portable electronic device, reference may be made to the foregoing method for adjusting the radius of the geo-fence. Details are not described herein again.

S311. The portable electronic device outputs a notification.

According to the notification outputting method provided in this embodiment of the present invention, when the geographical coordinates $a_1$ of the portable electronic device are located outside the first geo-fence, it indicates that the portable electronic device approaches but does not reach the first geo-fence. In this case, if the moving speed $v_1$ of the portable electronic device is greater than the preset threshold, it indicates that the portable electronic device fast goes through the first geo-fence. The portable electronic device may not collect geographical location coordinates within the first geo-fence because of a relatively small radius of the first geo-fence or relatively low frequency of collecting geographical location coordinates by the portable electronic device (that is, a relatively long period), and does not give a reminder about the first geo-fence to a user.

According to this solution, the second geo-fence may be set when the geographical coordinates $a_1$ of the portable electronic device are located outside the first geo-fence and the moving speed $v_1$ is greater than the preset threshold, that is, when the portable electronic device approaches but does not reach the first geo-fence and the portable electronic device will fast go through the first geo-fence. The radius $r_2$ of the second geo-fence is greater than the radius $r_1$ of the first geo-fence; therefore, a possibility that the portable electronic device collects geographical location coordinates within the second geo-fence is higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, the period for collecting geographical location coordinates by the portable electronic device may be decreased, that is, frequency of collecting geographical location coordinates by the portable electronic device may be increased, when the geographical coordinates $a_2$ are located within the second geo-fence and are located outside the first geo-fence. In this way, a possibility that the portable electronic device collects geographical location coordinates within the first geo-fence can be increased, so that a possibility that the portable electronic device detects that the portable electronic device is located within the first geo-fence can be increased, thereby increasing a possibility that a geo-fencing application works properly.

Optionally, in this embodiment of the present invention, the radius of the first geo-fence may be increased in addition to adjusting the period for collecting, by the portable electronic device, geographical location coordinates.

Figure 10:
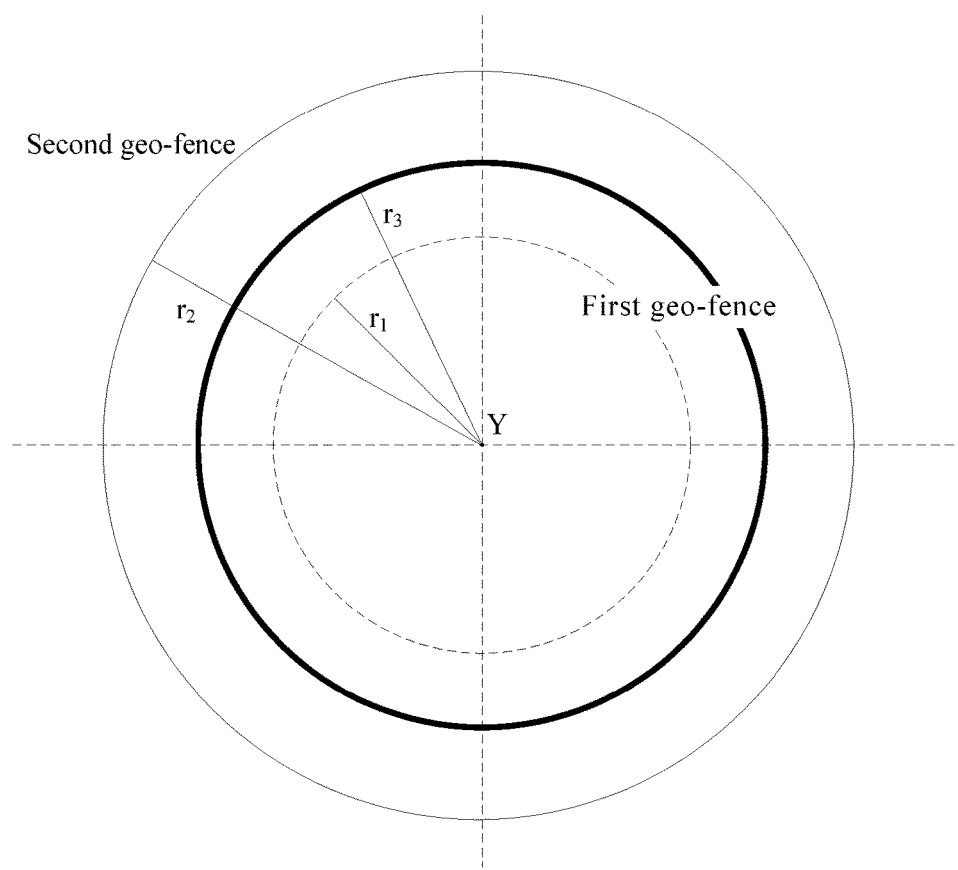
FIG. 10 is a schematic diagram of an example of another geo-fence according to an embodiment of the present invention.

For example, as shown in FIG. to, the portable electronic device may adjust the radius of the first geo-fence shown in FIG. 9 from $r_1$ to $r_3$, where $r_3$ is greater than $r_1$, and $r_3$ is less than $r_2$ (that is, $r_1<r_3<r_2$). In FIG. 10, a geo-fence marked by a thick black line is a first geo-fence whose radius has been adjusted, and a geo-fence marked by a dashed line is a first geo-fence whose radius has not been adjusted.

According to the notification outputting method provided in this embodiment of the present invention, the radius of the first geo-fence may be further increased. In this way, a possibility that the portable electronic device collects geographical location coordinates within the first geo-fence can be increased, so that a possibility that the portable electronic device detects that the portable electronic device is located within the first geo-fence can be increased, thereby increasing a possibility that a geo-fencing application works properly.

It should be understood that, similar to the technical effects achieved by increasing the radius of the geo-fence in the foregoing embodiments, increasing the radius of the geo-fence in this embodiment of the present invention herein can further increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

Figure 11:
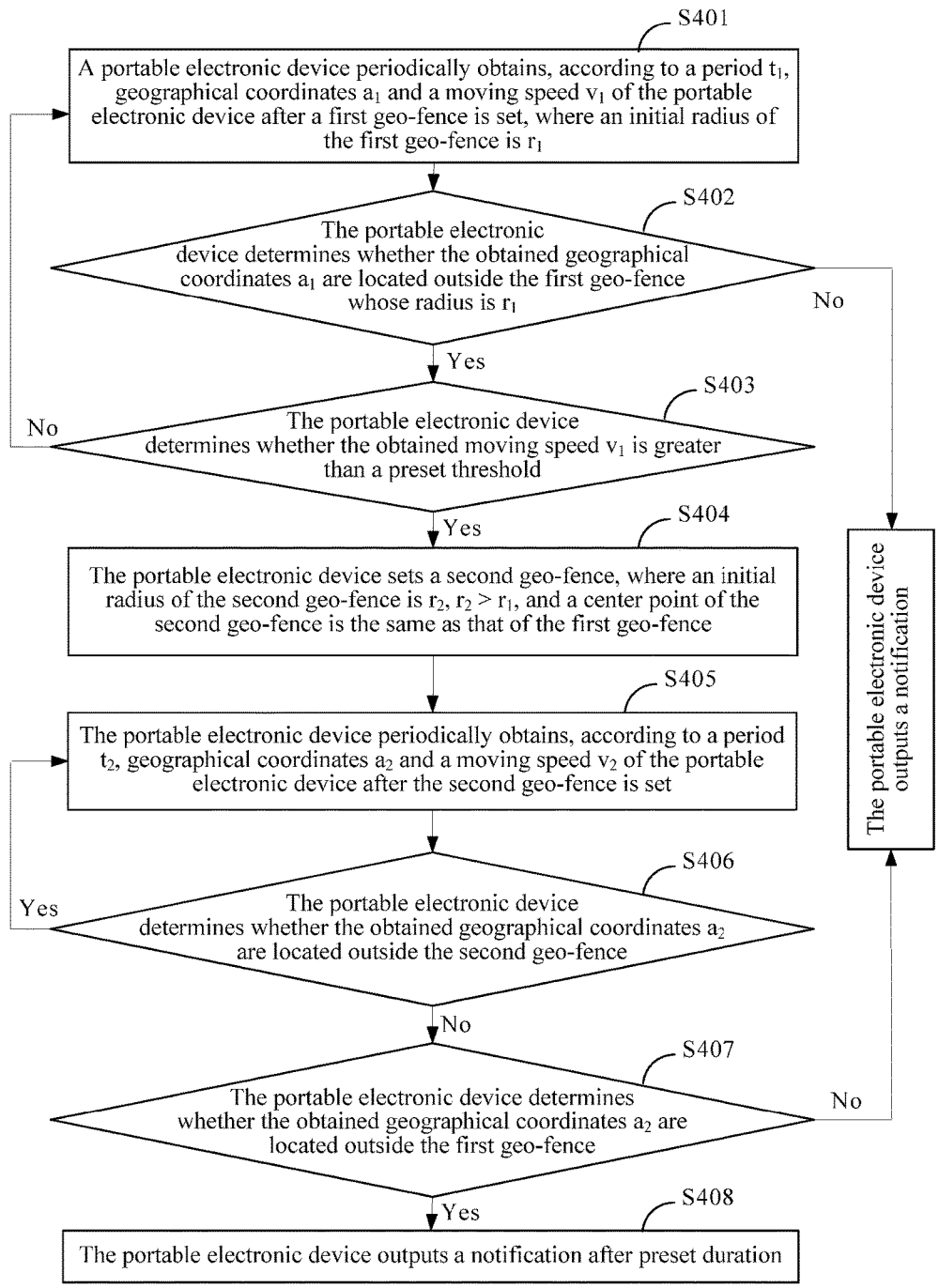
FIG. 11 is a flowchart of another notification outputting method according to an embodiment of the present invention.

An embodiment of the present invention provides a notification outputting method. The notification outputting method may be applied to the portable electronic device shown in FIG. 1. As shown in FIG. 11, the notification outputting method includes the following steps.

S401. The portable electronic device periodically obtains, according to a period $t_1$, geographical coordinates $a_1$ and a moving speed $v_1$ of the portable electronic device after a first geo-fence is set, where an initial radius of the first geo-fence is $r_1$.

It should be noted that, in this embodiment, for a specific method for obtaining, by the portable electronic device, a moving speed of the portable electronic device, reference may be made to the related descriptions in the foregoing embodiments. Details are not described in this embodiment herein again.

S402. The portable electronic device determines whether the obtained geographical coordinates $a_1$ are located outside the first geo-fence whose radius is $r_1$.

Specifically, if the geographical coordinates $a_1$ obtained by the portable electronic device are located outside the first geo-fence whose radius is $R_1$, S403 continues to be performed; if the geographical coordinates $a_1$ obtained by the portable electronic device are located within the first geofence whose radius is $r_1$, the portable electronic device outputs a notification.

S403. The portable electronic device determines whether the obtained moving speed $v_1$ is greater than a preset threshold.

It should be noted that, for a specific description of the preset threshold in this embodiment, reference may be made to the detailed descriptions of the preset threshold in the foregoing embodiments. Details are not described herein again.

Specifically, if the moving speed $v_1$ obtained by the portable electronic device is greater than the preset threshold, S404 continues to performed; if the moving speed $v_1$ obtained by the portable electronic device is less than or equal to the preset threshold, geographical coordinates and a moving speed of the portable electronic device are obtained.

S404. The portable electronic device sets a second geo-fence, where an initial radius of the second geo-fence is $r_2$, $r_2>r_1$, and a center point of the second geo-fence is the same as that of the first geo-fence.

S405. The portable electronic device periodically obtains, according to a period $t_2$, geographical coordinates $a_2$ and a moving speed $v_2$ of the portable electronic device after the second geo-fence is set.

After the second geo-fence is set, the fixed period $T_0$ may be used to obtain geographical coordinates and a moving speed of the portable electronic device, that is, $t_2=t_1$. Certainly, the period for obtaining geographical coordinates and a moving speed of the portable electronic device may alternatively be decreased, that is, $t_2<t_1$.

S406. The portable electronic device determines whether the obtained geographical coordinates $a_2$ are located outside the second geo-fence.

Specifically, if the geographical coordinates $a_2$ obtained by the portable electronic device are located within the second geo-fence, S407 continues to be performed; if the geographical coordinates $a_2$ obtained by the portable electronic device are located outside the second geo-fence, S405 continues to be performed.

S407. The portable electronic device determines whether the obtained geographical coordinates $a_2$ are located outside the first geo-fence.

Specifically, if the geographical coordinates $a_2$ obtained by the portable electronic device are located outside the first geo-fence, S408 continues to be performed; if the geographical coordinates $a_2$ obtained by the portable electronic device are located within the first geo-fence, the portable electronic device outputs a notification.

S408. The portable electronic device outputs a notification after preset duration.

Optionally, in an application scenario in this embodiment of the present invention, the preset duration is preconfigured fixed duration.

Preferably, in another application scenario in this embodiment of the present invention, the portable electronic device may adjust the preset duration in real time according to an obtained moving speed. The preset duration decreases as the speed of the portable electronic device increases.

For example, if a difference between the moving speed $v_2$ and the moving speed $v_1$, $\Delta v = v_2 - v_1$, is greater than a preset difference, the preset duration is adjusted from $\Delta T$ to $\Delta T - \Delta t$, where $\Delta t > 0$. Therefore, when the moving speed of the portable electronic device gradually increases, a time required by the portable electronic device to enter the first geo-fence decreases. In this case, the preset duration is adjusted from $\Delta T$ to $\Delta T - \Delta t$, so that a notification can be output in time.

According to the notification outputting method provided in this embodiment of the present invention, because $r_2 > r_1$, a possibility that the portable electronic device collects geographical location coordinates within the second geo-fence is higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, according to this solution, when the obtained geographical coordinates $a_1$ are located within the second geo-fence and are located outside the first geo-fence, a notification may be output after a delay of the preset duration. This can ensure that a geo-fencing application works properly.

Figure 12:
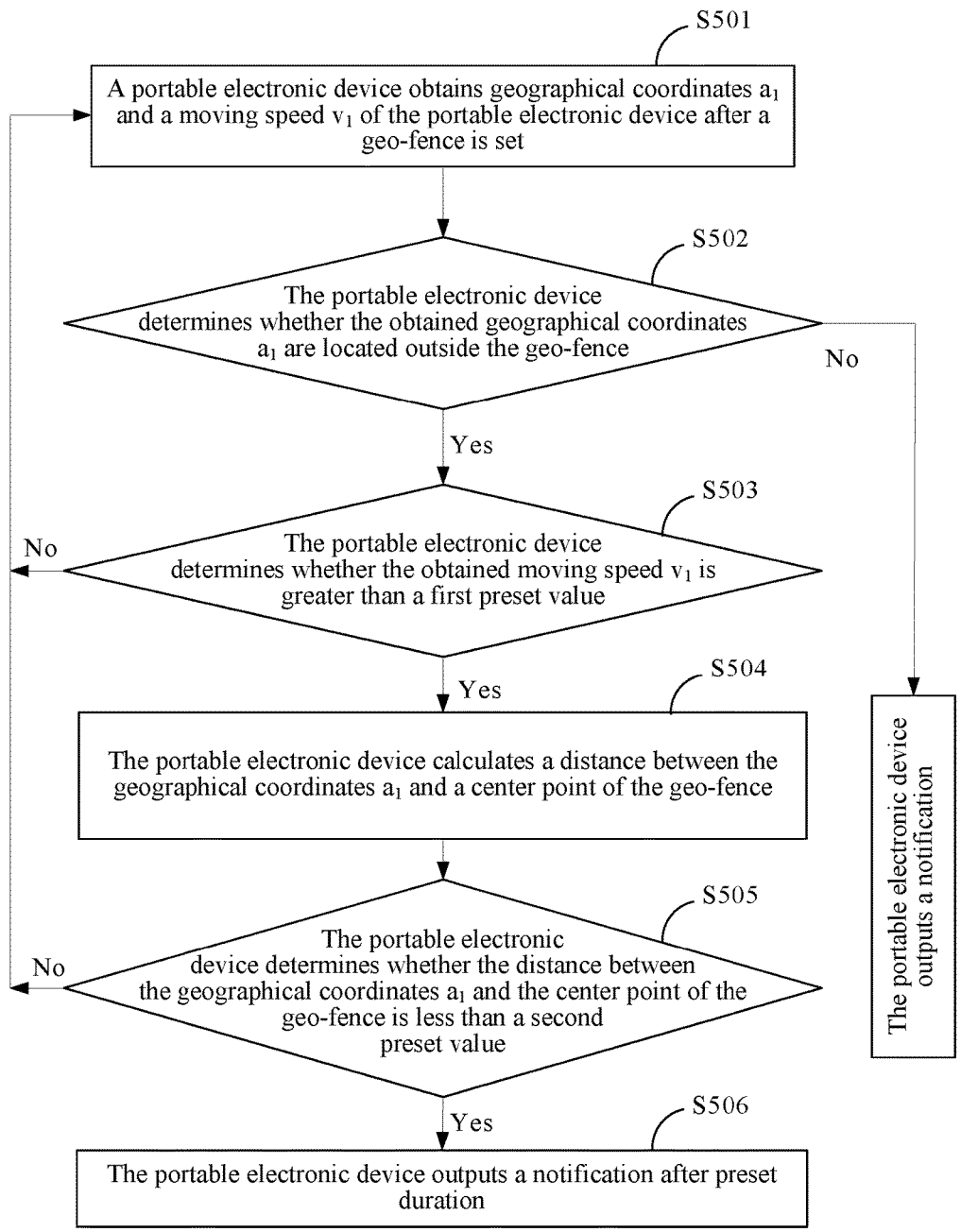
FIG. 12 is a flowchart of another notification outputting method according to an embodiment of the present invention.

An embodiment of the present invention provides a notification outputting method. The notification outputting method may be applied to the portable electronic device shown in FIG. 1. As shown in FIG. 12, the notification outputting method includes the following steps.

S501. The portable electronic device obtains geographical coordinates $a_1$ and a moving speed $v_1$ of the portable electronic device after a geo-fence is set.

It should be noted that, in this embodiment, for a specific method for obtaining, by the portable electronic device, a moving speed of the portable electronic device, reference may be made to the related descriptions in the foregoing embodiments. Details are not described in this embodiment herein again.

S502. The portable electronic device determines whether the obtained geographical coordinates $a_1$ are located outside the geo-fence.

Specifically, if the geographical coordinates $a_1$ obtained by the portable electronic device are located outside the geo-fence, S503 continues to be performed; if the geographical coordinates $a_1$ obtained by the portable electronic device are located within the geo-fence, the portable electronic device outputs a notification.

S503. The portable electronic device determines whether the obtained moving speed $v_1$ is greater than a first preset value.

If the moving speed $v_1$ obtained by the portable electronic device is greater than the first preset value, S504 continues to performed; if the moving speed $v_1$ obtained by the portable electronic device is less than or equal to the first preset value, geographical coordinates and a moving speed of the portable electronic device are obtained.

S504. The portable electronic device calculates a distance between the geographical coordinates $a_1$ and a center point of the geo-fence.

S505. The portable electronic device determines whether the distance between the geographical coordinates $a_1$ and the center point of the geo-fence is less than a second preset value.

If the distance between the geographical coordinates $a_1$ and the center point of the geo-fence is less than the second preset value, S506 continues to be performed; if the distance between the geographical coordinates $a_1$ and the center point of the geo-fence is greater than or equal to the second preset value, geographical coordinates and a moving speed of the portable electronic device are obtained.

S506. The portable electronic device outputs a notification after preset duration.

It should be noted that, for a detailed description of the preset duration in this embodiment of the present invention herein, reference may be made to the related descriptions of the preset duration in the foregoing embodiments. Details are not described in this embodiment of the present invention herein again.

According to the notification outputting method provided in this embodiment of the present invention, when the geographical coordinates $a_1$ are located outside the geo-fence and the moving speed $v_1$ is greater than the first preset value (that is, the portable electronic device approaches but does not reach the geo-fence, and will fast go through the geo-fence), if the distance between the geographical coordinates $a_1$ of the portable electronic device and the center point of the geo-fence is less than the second preset value, a notification may be output after a delay of the preset duration. This can ensure that a geo-fencing application works properly.

It should be noted that, all the notification outputting methods in the embodiments of the present invention may be applied to a scenario in which the portable electronic device approaches the geo-fence.

Figure 13:
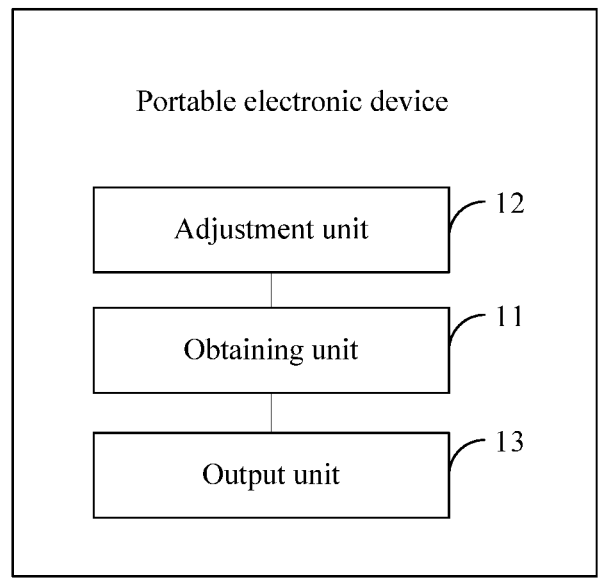
FIG. 13 is a schematic structural composition diagram of a portable electronic device according to an embodiment of the present invention.

An embodiment of the present invention provides a portable electronic device. The portable electronic device is configured to execute the notification outputting method shown in FIG. 2. The portable electronic device may include modules corresponding to corresponding steps. For example, as shown in FIG. 13, the portable electronic device may include an obtaining unit 11, an adjustment unit 12, and an output unit 13.

The obtaining unit 11 is configured to obtain geographical coordinates $a_1$ and a moving speed $v_1$ of the portable electronic device after a geo-fence is set.

The adjustment unit 12 is configured to adjust a radius of the geo-fence from $r_1$ to $r_2$ when the geographical coordinates $a_1$ obtained by the obtaining unit 11 are located outside the geo-fence and the moving speed $v_1$ obtained by the obtaining unit 11 is greater than a preset threshold, where $r_2>r_1$.

The obtaining unit 11 is further configured to obtain geographical coordinates $a_2$ and a moving speed $v_2$ of the portable electronic device after the adjustment unit 12 adjusts the radius of the geo-fence to $r_2$.

The output unit 13 is configured to output a notification when the geographical coordinates $a_2$ obtained by the obtaining unit 11 are located within the geo-fence whose radius is $r_1$.

It should be noted that, for specific descriptions of the preset threshold, $r_1$, and $r_2$ in this embodiment herein, reference may be made to the related content in the foregoing method embodiments. Details are not described in this embodiment of the present invention herein again.

Further, the obtaining unit 11 is specifically configured to divide a distance between geographical coordinates obtained at two times by a time difference for obtaining the geographical coordinates at two times, to obtain a moving speed of the portable electronic device.

Optionally, in a possible implementation, a period for obtaining, by the obtaining unit 11, geographical coordinates and a moving speed of the portable electronic device keeps unchanged.

Preferably, in another possible implementation, a period for obtaining, by the obtaining unit 11, geographical coordinates and a moving speed of the portable electronic device decreases as the speed increases.

Further, the adjustment unit 12 is further configured to: after adjusting the radius of the geo-fence to $r_1$, adjust the period for obtaining, by the obtaining unit 11, geographical coordinates and a moving speed of the portable electronic device from $t_1$ to $t_2$, where $t_2<t_1$.

In a possible implementation, the obtaining unit 11 and the adjustment unit 12 may be replaced with the processing module B shown in FIG. 1, and the output unit 13 may be replaced with the output module C shown in FIG. 1. This is not specifically limited in this embodiment of the present invention.

It should be noted that, for a detailed description of the portable electronic device provided in this embodiment, reference may be made to the related content in the foregoing method embodiments of the present invention. Details are not described in this embodiment herein again.

It should be understood that, when the geographical coordinates $a_1$ of the portable electronic device are located outside the geo-fence, it indicates that the portable electronic device approaches but does not reach the geo-fence. In this case, if the moving speed $v_1$ of the portable electronic device is greater than the preset threshold, it indicates that the portable electronic device fast goes through the geo-fence. The portable electronic device may not collect geographical location coordinates within the geo-fence because of a relatively small radius of the geo-fence, and does not give a reminder about the geo-fence to a user.

The portable electronic device provided in this embodiment of the present invention may increase the radius of the geo-fence when the geographical coordinates $a_1$ of the portable electronic device are located outside the geo-fence and the moving speed $v_1$ of the portable electronic device is greater than the preset threshold, that is, when the portable electronic device approaches but does not reach the geo-fence and the portable electronic device will fast go through the geo-fence. On the premise that frequency of collecting geographical location coordinates keeps unchanged, increasing the radius of the geo-fence can increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

Figure 14:
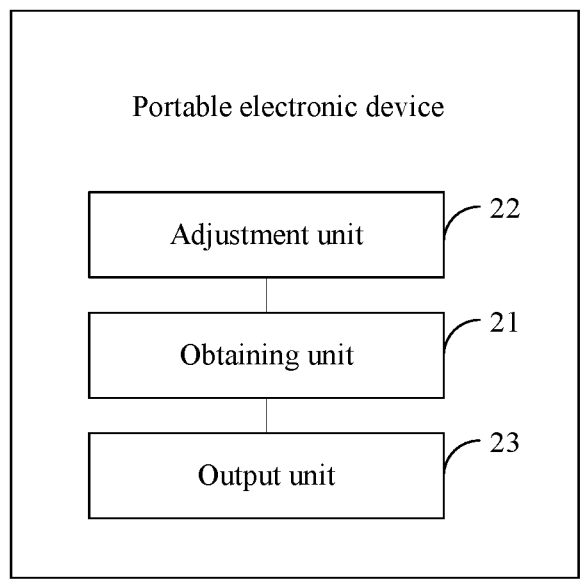
FIG. 14 is a schematic structural composition diagram of another portable electronic device according to an embodiment of the present invention.

An embodiment of the present invention provides a portable electronic device. The portable electronic device is configured to execute the notification outputting method shown in FIG. 6. The portable electronic device may include modules corresponding to corresponding steps. For example, as shown in FIG. 14, the portable electronic device may include an obtaining unit 21, an adjustment unit 22, and an output unit 23.

The obtaining unit 21 is configured to periodically obtain, according to a period $t_1$, geographical coordinates $a_1$ and a moving speed $v_1$ of the portable electronic device after a geo-fence is set.

The adjustment unit 22 is configured to adjust the period for obtaining, by the obtaining unit, geographical coordinates and a moving speed of the portable electronic device from $t_1$ to $t_2$, when the geographical coordinates $a_1$ obtained by the obtaining unit 21 are located outside the geo-fence and the moving speed $v_1$ obtained by the obtaining unit 21 is greater than a first preset threshold, where $t_2<t_1$.

The obtaining unit 21 is further configured to periodically obtain, according to the period $t_2$, geographical coordinates $a_2$ and a moving speed $v_2$ of the portable electronic device.

The output unit 23 is configured to output a notification when the geographical coordinates $a_2$ obtained by the obtaining unit 21 are located within the geo-fence.

Further, the adjustment unit 22 is further configured to: after the obtaining unit 21 periodically obtains, according to the period $t_2$, the geographical coordinates $a_2$ and the moving speed $v_2$ of the portable electronic device, adjust a radius of the geo-fence from $r_1$ to $r_2$ when the geographical coordinates $a_2$ obtained by the obtaining unit 21 are located outside the geo-fence and the moving speed $v_2$ obtained by the obtaining unit 21 is greater than the first preset threshold or a second preset threshold, where $r_2>r_1$, and the second preset threshold is greater than the first preset threshold.

It should be noted that, for specific descriptions of the first preset threshold, the second preset threshold, $t_2$, $r_1$, and $r_2$ in this embodiment herein, reference may be made to the related content in the foregoing method embodiments. Details are not described in this embodiment of the present invention herein again.

Further, the obtaining unit 21 is specifically configured to divide a distance between geographical coordinates obtained at two times by a time difference for obtaining the geographical coordinates at two times, to obtain a moving speed of the portable electronic device.

In a possible implementation, the obtaining unit 21 and the adjustment unit 22 may be replaced with the processing module B shown in FIG. 1, and the output unit 23 may be replaced with the output module C shown in FIG. 1. This is not specifically limited in this embodiment of the present invention.

It should be noted that, for a detailed description of the portable electronic device provided in this embodiment, reference may be made to the related content in the foregoing method embodiments of the present invention. Details are not described in this embodiment herein again.

It should be understood that, when the geographical coordinates $a_1$ of the portable electronic device are located outside the geo-fence, it indicates that the portable electronic device approaches but does not reach the geo-fence. In this case, if the moving speed $v_1$ of the portable electronic device is greater than the first preset threshold, it indicates that the portable electronic device fast goes through the geo-fence. The portable electronic device may not collect geographical location coordinates within the geo-fence because of relatively low frequency of collecting geographical location coordinates by the portable electronic device (that is, a relatively long period), and does not give a reminder about the geo-fence to a user.

The portable electronic device provided in this embodiment of the present invention may decrease the period for collecting geographical location coordinates by the portable electronic device, that is, increase frequency of collecting geographical location coordinates by the portable electronic device, when the geographical coordinates $a_1$ of the portable electronic device are located outside the geo-fence and the moving speed $v_1$ of the portable electronic device is greater than the first preset threshold, that is, when the portable electronic device approaches but does not reach the geo-fence and the portable electronic device will fast go through the geo-fence. In this way, a possibility that the portable electronic device collects geographical location coordinates within the geo-fence can be increased, so that a possibility that the portable electronic device detects that the portable electronic device is located within the geo-fence can be increased, thereby increasing a possibility that a geo-fencing application works properly.

Figure 15:
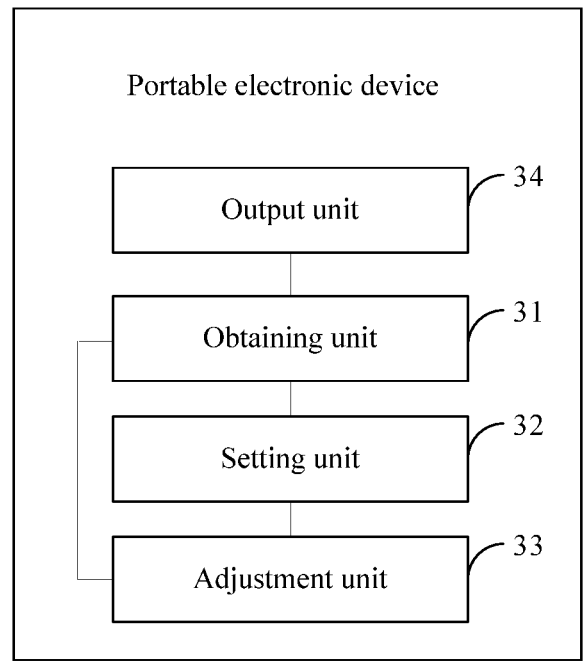
FIG. 15 is a schematic structural composition diagram of another portable electronic device according to an embodiment of the present invention.

An embodiment of the present invention provides a portable electronic device. The portable electronic device is configured to execute the notification outputting method shown in FIG. 8A and FIG. 8B. The portable electronic device may include modules corresponding to corresponding steps. For example, as shown in FIG. 15, the portable electronic device may include an obtaining unit 31, a setting unit 32, an adjustment unit 33, and an output unit 34.

The obtaining unit 31 is configured to periodically obtain, according to a period $t_1$, geographical coordinates $a_1$ and a moving speed $v_1$ of the portable electronic device after a first geo-fence is set, where an initial radius of the first geo-fence is $r_1$.

The setting unit 32 is configured to set a second geo-fence when the geographical coordinates $a_1$ obtained by the obtaining unit 31 are located outside the first geo-fence and the moving speed $v_1$ obtained by the obtaining unit 31 is greater than a preset threshold, where an initial radius of the second geo-fence is $r_2$, $r_2 > r_1$, and a center point of the second geo-fence is the same as that of the first geo-fence.

The obtaining unit 31 is further configured to periodically obtain, according to the period $t_1$, geographical coordinates $a_2$ and a moving speed $v_2$ of the portable electronic device after the setting unit 32 sets the second geo-fence.

The adjustment unit 33 is configured to adjust the period for obtaining geographical coordinates and a moving speed of the portable electronic device from $t_1$ to $t_2$, when the geographical coordinates $a_2$ obtained by the obtaining unit 31 are located within the second geo-fence and the geographical coordinates $a_2$ obtained by the obtaining unit 31 are located outside the first geo-fence, where $t_2 < t_1$.

The obtaining unit 31 is further configured to periodically obtain, according to the period $t_2$, geographical coordinates $a_3$ and a moving speed $v_3$ of the portable electronic device.

The output unit 34 is configured to output a notification when the geographical coordinates $a_3$ obtained by the obtaining unit 31 are located within the first geo-fence.

It should be noted that, for specific descriptions of the preset threshold, $t_2$, and $r_2$ in this embodiment herein, reference may be made to the related content in the foregoing method embodiments. Details are not described in this embodiment of the present invention herein again.

Further, the obtaining unit 31 is specifically configured to divide a distance between geographical coordinates obtained at two times by a time difference for obtaining the geographical coordinates at two times, to obtain a moving speed of the portable electronic device.

Further, the adjustment unit 33 is further configured to: after the adjustment unit 33 adjusts the period for obtaining, by the obtaining unit 31, geographical coordinates and a moving speed of the portable electronic device from $t_1$ to $t_2$, adjust the radius of the first geo-fence from $r_1$ to $r_3$, where $r_3$ is greater than $r_1$, and $r_3$ is less than $r_2$.

Preferably, $r_2$ is greater than or equal to a sum of $r_1$ and a product of $v_1$ and $t_1$, that is, $r_2 \leq v_1 \times t_1 + r_1$.

In a possible implementation, the obtaining unit 31, the setting unit 32, and the adjustment unit 33 may be replaced with the processing module B shown in FIG. 1, and the output unit 34 may be replaced with the output module C shown in FIG. 1. This is not specifically limited in this embodiment of the present invention.

It should be noted that, for a detailed description of the portable electronic device provided in this embodiment, reference may be made to the related content in the foregoing method embodiments of the present invention. Details are not described in this embodiment herein again.

It should be understood that, when the geographical coordinates $a_1$ of the portable electronic device are located outside the first geo-fence, it indicates that the portable electronic device approaches but does not reach the first geo-fence. In this case, if the moving speed $v_1$ of the portable electronic device is greater than the preset threshold, it indicates that the portable electronic device fast goes through the first geo-fence. The portable electronic device may not collect geographical location coordinates within the first geo-fence because of a relatively small radius of the first geo-fence or relatively low frequency of collecting geographical location coordinates by the portable electronic device (that is, a relatively long period), and does not give a reminder about the first geo-fence to a user.

The portable electronic device provided in this embodiment of the present invention may set the second geo-fence when the geographical coordinates $a_1$ of the portable electronic device are located outside the first geo-fence and the moving speed $v_1$ is greater than the preset threshold, that is, when the portable electronic device approaches but does not reach the first geo-fence and the portable electronic device will fast go through the first geo-fence. The radius $r_2$ of the second geo-fence is greater than the radius $r_1$ of the first geo-fence; therefore, a possibility that the portable electronic device collects geographical location coordinates within the second geo-fence is higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, the period for collecting geographical location coordinates by the portable electronic device may be decreased, that is, frequency of collecting geographical location coordinates by the portable electronic device may be increased, when the geographical coordinates $a_2$ are located within the second geo-fence and are located outside the first geo-fence. In this way, a possibility that the portable electronic device collects geographical location coordinates within the first geo-fence can be increased, so that a possibility that the portable electronic device detects that the portable electronic device is located within the first geo-fence can be increased, thereby increasing a possibility that a geo-fencing application works properly.

Figure 16:
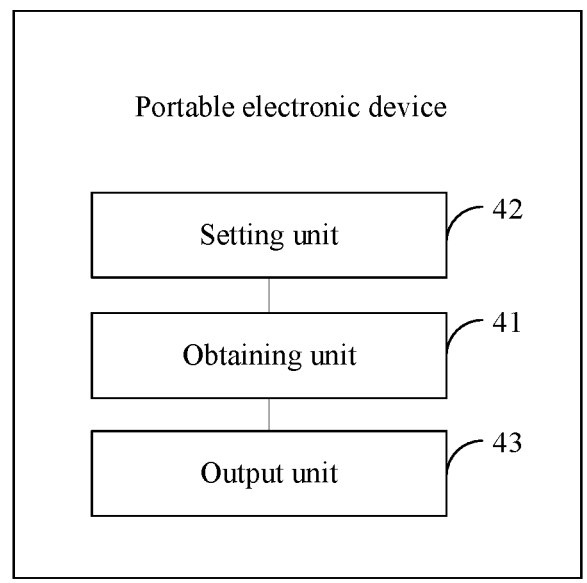
FIG. 16 is a schematic structural composition diagram of another portable electronic device according to an embodiment of the present invention.

An embodiment of the present invention provides a portable electronic device. The portable electronic device is configured to execute the notification outputting method shown in FIG. 11. The portable electronic device may include modules corresponding to corresponding steps. For example, as shown in FIG. 16, the portable electronic device may include an obtaining unit 41, a setting unit 42, and an output unit 43.

The obtaining unit 41 is configured to periodically obtain, according to a period $t_1$, geographical coordinates $a_1$ and a moving speed $v_1$ of the portable electronic device after a first geo-fence is set, where an initial radius of the first geo-fence is $r_1$.

The setting unit 42 is configured to set a second geo-fence when the geographical coordinates $a_1$ obtained by the obtaining unit 41 are located outside the first geo-fence and the moving speed $v_1$ obtained by the obtaining unit 41 is greater than a preset threshold, where an initial radius of the second geo-fence is $r_2$, $r_2 > r_1$, and a center point of the second geo-fence is the same as that of the first geo-fence.

The obtaining unit 41 is further configured to periodically obtain, according to a period $t_2$, geographical coordinates $a_2$ and a moving speed $v_2$ of the portable electronic device after the setting unit 42 sets the second geo-fence.

The output unit 43 is configured to: when the geographical coordinates $a_2$ obtained by the obtaining unit 41 are located within the second geo-fence and are located outside the first geo-fence, output a notification after preset duration.

It should be noted that, for specific descriptions of the preset threshold, the preset duration, and $r_2$ in this embodiment herein, reference may be made to the related content in the foregoing method embodiments. Details are not described in this embodiment of the present invention herein again.

Further, the obtaining unit 41 is specifically configured to divide a distance between geographical coordinates obtained at two times by a time difference for obtaining the geographical coordinates at two times, to obtain a moving speed of the portable electronic device.

Further, $t_2 < t_1$, or $t_2 = t_1$.

Optionally, in a possible implementation, the preset duration is preconfigured fixed duration.

Preferably, in another possible implementation, the portable electronic device may adjust a value of the preset duration in real time according to a change in the moving speed of the portable electronic device. The preset duration decreases as the speed of the portable electronic device increases.

Figure 17:
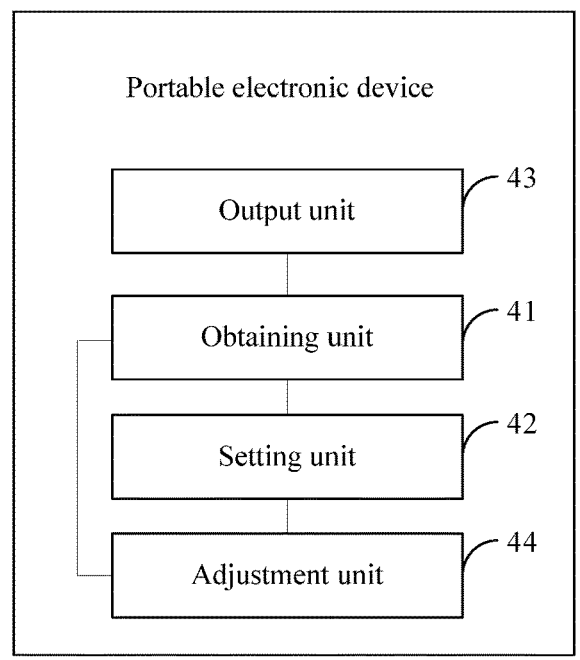
FIG. 17 is a schematic structural composition diagram of another portable electronic device according to an embodiment of the present invention.

Specifically, as shown in FIG. 17, the portable electronic device may further include an adjustment unit 44.

The adjustment unit 44 is configured to adjust the preset duration from $\Delta T$ to $\Delta T - \Delta t$ when a difference between the moving speed $v_2$ and the moving speed $v_1$ that are obtained by the obtaining unit 41, $\Delta v = v_2 - v_1$, is greater than a preset difference, where $\Delta t > 0$.

In a possible implementation, the obtaining unit 41, the setting unit 42, and the adjustment unit 44 may be replaced with the processing module B shown in FIG. 1, and the output unit 43 may be replaced with the output module C shown in FIG. 1. This is not specifically limited in this embodiment of the present invention.

It should be noted that, for a detailed description of the portable electronic device provided in this embodiment, reference may be made to the related content in the foregoing method embodiments of the present invention. Details are not described in this embodiment herein again.

Similar to the foregoing embodiments, a possibility that the portable electronic device provided in this embodiment collects geographical location coordinates within the second geo-fence may be higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, according to this solution, when the obtained geographical coordinates $a_2$ are located within the second geo-fence and are located outside the first geo-fence, a notification may be output after a delay of $\Delta T$. This can ensure that a geo-fencing application works properly.

Figure 18:
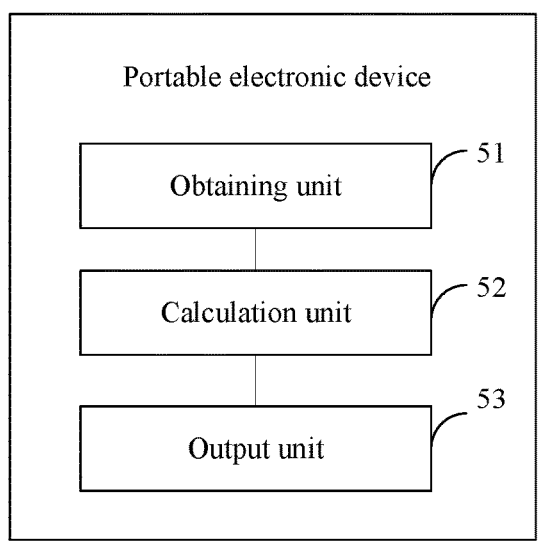
FIG. 18 is a schematic structural composition diagram of another portable electronic device according to an embodiment of the present invention.

An embodiment of the present invention provides a portable electronic device. The portable electronic device is configured to execute the notification outputting method shown in FIG. 12. The portable electronic device may include modules corresponding to corresponding steps. For example, as shown in FIG. 18, the portable electronic device may include an obtaining unit 51, a calculation unit 52, and an output unit 53.

The obtaining unit 51 is configured to obtain geographical coordinates $a_1$ and a moving speed $v_1$ of the portable electronic device after a geo-fence is set.

The calculation unit 52 is configured to calculate a distance between the geographical coordinates $a_1$ and a center point of the geo-fence when the geographical coordinates $a_1$ obtained by the obtaining unit 51 are located outside the geo-fence and the moving speed $v_1$ obtained by the obtaining unit is greater than a first preset value.

The output unit 53 is configured to: if the distance between the geographical coordinates $a_1$ and the center point of the geo-fence, calculated by the calculation unit 52, is less than a second preset value, output a notification after preset duration.

Further, the obtaining unit 51 is specifically configured to divide a distance between geographical coordinates obtained at two times by a time difference for obtaining the geographical coordinates at two times, to obtain a moving speed of the portable electronic device.

Optionally, in a possible implementation, the preset duration is preconfigured fixed duration.

Preferably, in another possible implementation, the portable electronic device may adjust a value of the preset duration in real time according to a change in the moving speed of the portable electronic device. The preset duration decreases as the speed of the portable electronic device increases.

Figure 19:
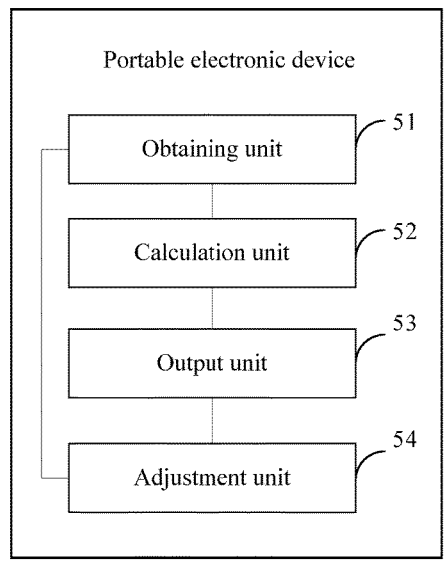
FIG. 19 is a schematic structural composition diagram of another portable electronic device according to an embodiment of the present invention.

Specifically, as shown in FIG. 19, the portable electronic device may further include an adjustment unit 54.

The obtaining unit 51 is further configured to obtain a moving speed $v_2$ of the portable electronic device after obtaining the geographical coordinates $a_1$ and the moving speed $v_1$.

The adjustment unit 54 is configured to adjust the preset duration from $\Delta T$ to $\Delta T-\Delta t$ when a difference between the moving speed $v_2$ and the moving speed $v_1$ that are obtained by the obtaining unit 51, $\Delta v=v_2-v_1$, is greater than a preset difference, where $\Delta t>0$.

In a possible implementation, the obtaining unit 51, the calculation unit 52, and the adjustment unit 54 may be replaced with the processing module B shown in FIG. 1, and the output unit 53 may be replaced with the output module C shown in FIG. 1. This is not specifically limited in this embodiment of the present invention.

It should be noted that, for a detailed description of the portable electronic device provided in this embodiment, reference may be made to the related content in the foregoing method embodiments of the present invention. Details are not described in this embodiment herein again.

When the geographical coordinates $a_1$ are located outside the geo-fence whose radius is $r_1$ and the moving speed $v_1$ is greater than the first preset value (that is, the portable electronic device approaches but does not reach the geo-fence, and will fast go through the geo-fence), if the distance between the geographical coordinates $a_1$ of the portable electronic device and the center point of the geo-fence is less than the second preset value, the portable electronic device provided in this embodiment may output a notification after a delay of $\Delta T$. This can ensure that a geo-fencing application works properly.

Figure 20:
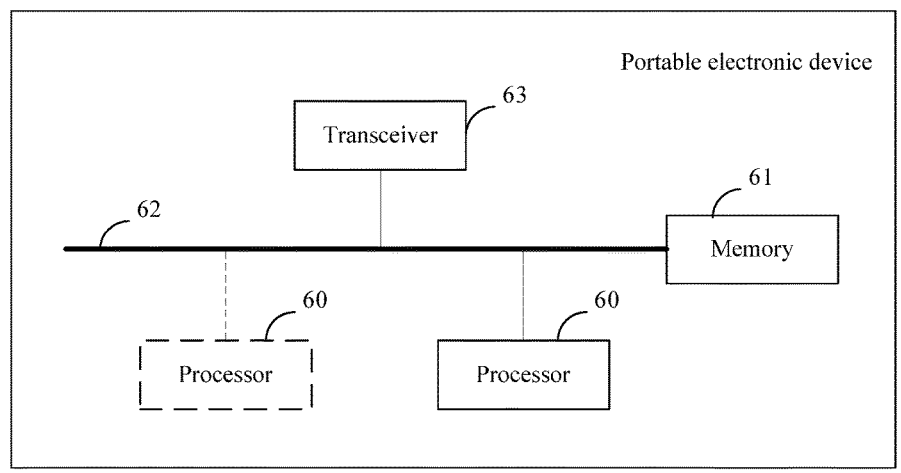
FIG. 20 is a schematic structural composition diagram of another portable electronic device according to an embodiment of the present invention.

As shown in FIG. 20, an embodiment of the present invention provides a portable electronic device. The portable electronic device includes one or more processors 60, a memory 61, a bus system 62, a transceiver 63, and one or more application programs, where the one or more processors, the memory 61, and the transceiver 63 are connected by using the bus system 62.

The one or more application programs are stored in the memory 61, the one or more application programs include an instruction, and when the processor 60 of the portable electronic device executes the instruction, the portable electronic device executes the notification outputting method shown in FIG. 2. For the specific notification outputting method, reference may be made to the related description in the embodiment shown in FIG. 2. Details are not described herein again.

This embodiment further provides a computer-readable storage medium, where the computer-readable storage medium stores one or more programs, the one or more programs include an instruction, and when the processor 60 of the portable electronic device executes the instruction, the portable electronic device executes the notification outputting method shown in FIG. 2.

For a specific description of the one or more processors 600, reference may be made to the related description of the processing module B. Details are not described in this embodiment herein again. For a specific description of the memory 61, reference may be made to the related description of the storage module E. Details are not described in this embodiment herein again.

The bus system 62 may include a data bus, a power bus, a control bus, a signal status bus, and the like. For clear description in this embodiment, various buses in FIG. 20 are marked as the bus system 62.

The transceiver 63 may be specifically an interface circuit on the portable electronic device. The transceiver may be a radio transceiver. For example, the radio transceiver may be an antenna of the portable electronic device or the like. Data is received and sent between the one or more processors 60 and another device by using the transceiver 63. The transceiver 63 may be corresponding to the output module C and/or the communications module D.

During specific implementation, the steps in the method procedure shown in FIG. 2 may be implemented by executing, by the processor 60 in a hardware form, a computer executable instruction in a software form stored in the memory 61. To avoid repetition, details are not described herein again.

It should be noted that, for a detailed description of the portable electronic device provided in this embodiment, reference may be made to the related content in the foregoing method embodiments of the present invention. Details are not described in this embodiment herein again.

The portable electronic device provided in this embodiment of the present invention may increase the radius of the geo-fence when the geographical coordinates $a_1$ of the portable electronic device are located outside the geo-fence and the moving speed $v_1$ of the portable electronic device is greater than the preset threshold, that is, when the portable electronic device approaches but does not reach the geofence and the portable electronic device will fast go through the geo-fence. On the premise that frequency of collecting geographical location coordinates keeps unchanged, increasing the radius of the geo-fence can increase a possibility that the portable electronic device collects geographical location coordinates within the geo-fence, so that a possibility that the portable electronic device detects that the portable electronic device is located within the geo-fence can be increased, thereby increasing a possibility that a geo-fencing application works properly.

Figure 21:
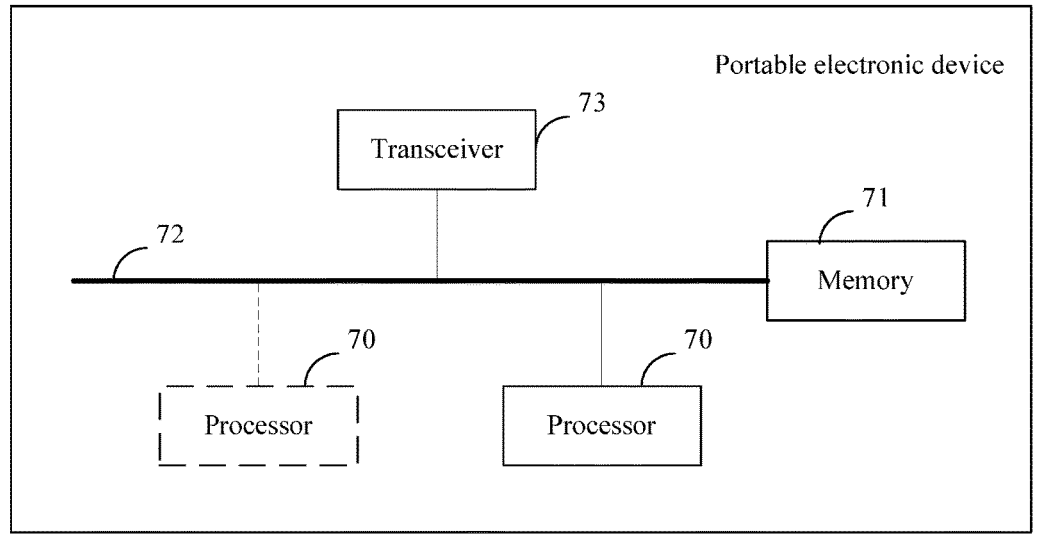
FIG. 21 is a schematic structural composition diagram of another portable electronic device according to an embodiment of the present invention.

As shown in FIG. 21, an embodiment of the present invention provides a portable electronic device. The portable electronic device includes one or more processors 70, a memory 71, a bus system 72, a transceiver 73, and one or more application programs, where the one or more processors, the memory 71, and the transceiver 73 are connected by using the bus system 72.

The one or more application programs are stored in the memory 71, the one or more application programs include an instruction, and when the processor 70 of the portable electronic device executes the instruction, the portable electronic device executes the notification outputting method shown in FIG. 6. For the specific notification outputting method, reference may be made to the related description in the embodiment shown in FIG. 6. Details are not described herein again.

This embodiment further provides a computer-readable storage medium, where the computer-readable storage medium stores one or more programs, the one or more programs include an instruction, and when the processor 70 of the portable electronic device executes the instruction, the portable electronic device executes the notification outputting method shown in FIG. 6.

For a specific description of the one or more processors 70, reference may be made to the related description of the processing module B. Details are not described in this embodiment herein again. For a specific description of the memory 71, reference may be made to the related description of the storage module E. Details are not described in this embodiment herein again.

The bus system 72 may include a data bus, a power bus, a control bus, a signal status bus, and the like. For clear description in this embodiment, various buses in FIG. 21 are marked as the bus system 72.

The transceiver 73 may be specifically an interface circuit on the portable electronic device. The transceiver may be a radio transceiver. For example, the radio transceiver may be an antenna of the portable electronic device or the like. Data is received and sent between the one or more processors 70 and another device by using the transceiver 73. The transceiver 73 may be corresponding to the output module C and/or the communications module D.

During specific implementation, the steps in the method procedure shown in FIG. 6 may be implemented by executing, by the processor 70 in a hardware form, a computer executable instruction in a software form stored in the memory 71. To avoid repetition, details are not described herein again.

It should be noted that, for a detailed description of the portable electronic device provided in this embodiment, reference may be made to the related content in the foregoing method embodiments of the present invention. Details are not described in this embodiment herein again.

The portable electronic device provided in this embodiment of the present invention may decrease the period for collecting geographical location coordinates by the portable electronic device, that is, increase frequency of collecting geographical location coordinates by the portable electronic device, when the geographical coordinates $a_1$ of the portable electronic device are located outside the geo-fence and the moving speed $v_1$ of the portable electronic device is greater than the preset threshold, that is, when the portable electronic device approaches but does not reach the geo-fence and the portable electronic device will fast go through the geo-fence. In this way, a possibility that the portable electronic device collects geographical location coordinates within the geo-fence can be increased, so that a possibility that the portable electronic device detects that the portable electronic device is located within the geo-fence can be increased, thereby increasing a possibility that a geo-fencing application works properly.

Figure 22:
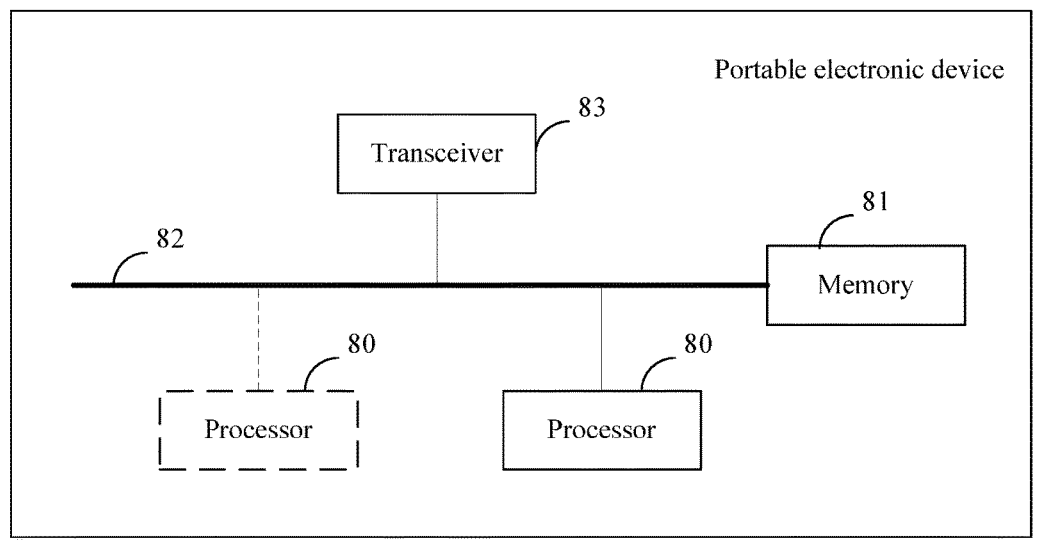
FIG. 22 is a schematic structural composition diagram of another portable electronic device according to an embodiment of the present invention.

As shown in FIG. 22, an embodiment of the present invention provides a portable electronic device. The portable electronic device includes one or more processors 80, a memory 81, a bus system 82, a transceiver 83, and one or more application programs, where the one or more processors, the memory 81, and the transceiver 83 are connected by using the bus system 82.

The one or more application programs are stored in the memory 81, the one or more application programs include an instruction, and when the processor 80 of the portable electronic device executes the instruction, the portable electronic device executes the notification outputting method shown in FIG. 8A and FIG. 8B. For the specific notification outputting method, reference may be made to the related description in the embodiment shown in FIG. 8A and FIG. 8B. Details are not described herein again.

This embodiment further provides a computer-readable storage medium, where the computer-readable storage medium stores one or more programs, the one or more programs include an instruction, and when the processor 80 of the portable electronic device executes the instruction, the portable electronic device executes the notification outputting method shown in FIG. 8A and FIG. 8B.

For a specific description of the one or more processors 80, reference may be made to the related description of the processing module B. Details are not described in this embodiment herein again. For a specific description of the memory 81, reference may be made to the related description of the storage module E. Details are not described in this embodiment herein again.

The bus system 82 may include a data bus, a power bus, a control bus, a signal status bus, and the like. For clear description in this embodiment, various buses in FIG. 22 are marked as the bus system 82.

The transceiver 83 may be specifically an interface circuit on the portable electronic device. The transceiver may be a radio transceiver. For example, the radio transceiver may be an antenna of the portable electronic device or the like. Data is received and sent between the one or more processors 80 and another device by using the transceiver 83. The transceiver 83 may be corresponding to the output module C and/or the communications module D.

During specific implementation, the steps in the method procedure shown in FIG. 8A and FIG. 8B may be implemented by executing, by the processor 80 in a hardware form, a computer executable instruction in a software form stored in the memory 81. To avoid repetition, details are not described herein again.

It should be noted that, for a detailed description of the portable electronic device provided in this embodiment, reference may be made to the related content in the foregoing method embodiments of the present invention. Details are not described in this embodiment herein again.

The portable electronic device provided in this embodiment of the present invention may set the second geo-fence when the geographical coordinates $a_1$ of the portable electronic device are located outside the first geo-fence and the moving speed $v_1$ is greater than the preset threshold, that is, when the portable electronic device approaches but does not reach the first geo-fence and the portable electronic device will fast go through the first geo-fence. The radius $r_2$ of the second geo-fence is greater than the radius $r_1$ of the first geo-fence; therefore, a possibility that the portable electronic device collects geographical location coordinates within the second geo-fence is higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, the period for collecting geographical location coordinates by the portable electronic device may be decreased, that is, frequency of collecting geographical location coordinates by the portable electronic device may be increased, when the geographical coordinates $a_2$ are located within the second geo-fence and are located outside the first geo-fence. In this way, a possibility that the portable electronic device collects geographical location coordinates within the first geo-fence can be increased, so that a possibility that the portable electronic device detects that the portable electronic device is located within the first geo-fence can be increased, thereby increasing a possibility that a geo-fencing application works properly.

Figure 23:
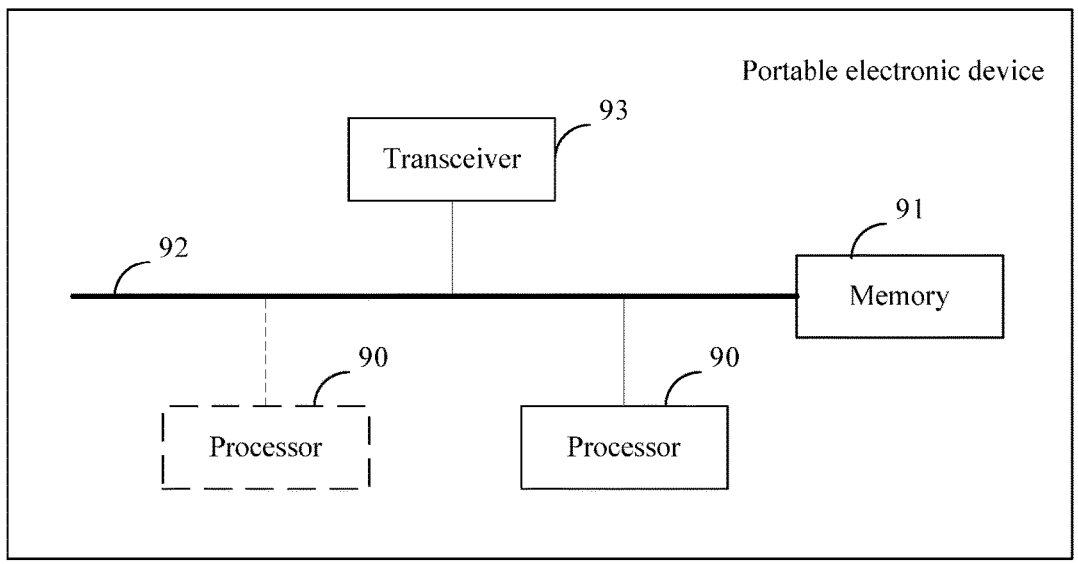
FIG. 23 is a schematic structural composition diagram of another portable electronic device according to an embodiment of the present invention.

As shown in FIG. 23, an embodiment of the present invention provides a portable electronic device. The portable electronic device includes one or more processors 90, a memory 91, a bus system 92, a transceiver 93, and one or more application programs, where the one or more processors, the memory 91, and the transceiver 93 are connected by using the bus system 92.

The one or more application programs are stored in the memory 91, the one or more application programs include an instruction, and when the processor 900 of the portable electronic device executes the instruction, the portable electronic device executes the notification outputting method shown in FIG. 11. For the specific notification outputting method, reference may be made to the related description in the embodiment shown in FIG. 11. Details are not described herein again.

This embodiment further provides a computer-readable storage medium, where the computer-readable storage medium stores one or more programs, the one or more programs include an instruction, and when the processor 90 of the portable electronic device executes the instruction, the portable electronic device executes the notification outputting method shown in FIG. 11.

For a specific description of the one or more processors 90, reference may be made to the related description of the processing module B. Details are not described in this embodiment herein again. For a specific description of the memory 91, reference may be made to the related description of the storage module E. Details are not described in this embodiment herein again.

The bus system 92 may include a data bus, a power bus, a control bus, a signal status bus, and the like. For clear description in this embodiment, various buses in FIG. 23 are marked as the bus system 92.

The transceiver 93 may be specifically an interface circuit on the portable electronic device. The transceiver may be a radio transceiver. For example, the radio transceiver may be an antenna of the portable electronic device or the like. Data is received and sent between the one or more processors 900 and another device by using the transceiver 93. The transceiver 93 may be corresponding to the output module C and/or the communications module D.

During specific implementation, the steps in the method procedure shown in FIG. 11 may be implemented by executing, by the processor 900 in a hardware form, a computer executable instruction in a software form stored in the memory 91. To avoid repetition, details are not described herein again.

It should be noted that, for a detailed description of the portable electronic device provided in this embodiment, reference may be made to the related content in the foregoing method embodiments of the present invention. Details are not described in this embodiment herein again.

Similar to the foregoing embodiments, a possibility that the portable electronic device provided in this embodiment collects geographical location coordinates within the second geo-fence may be higher than a possibility that the portable electronic device collects geographical location coordinates within the first geo-fence, that is, a possibility that the portable electronic device detects that the portable electronic device is located within the second geo-fence is higher than a possibility that the portable electronic device detects that the portable electronic device is located within the second geo-fence.

In addition, according to this solution, when the obtained geographical coordinates $a_2$ are located within the second geo-fence and are located outside the first geo-fence, a notification may be output after a delay of the preset duration. This can ensure that a geo-fencing application works properly.

Figure 24:
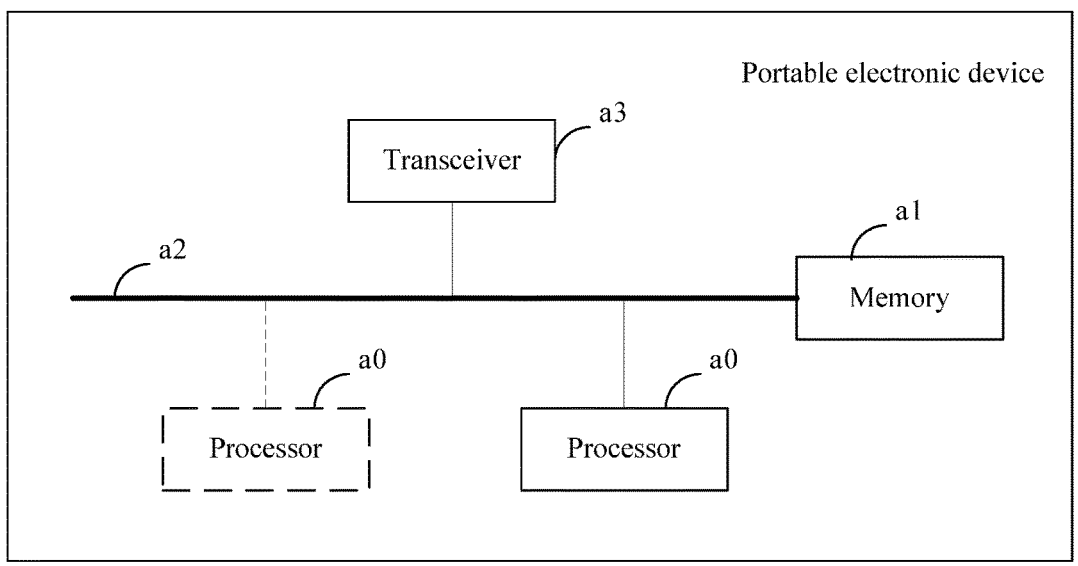
FIG. 24 is a schematic structural composition diagram of another portable electronic device according to an embodiment of the present invention.

As shown in FIG. 24, an embodiment of the present invention provides a portable electronic device. The portable electronic device includes one or more processors a0, a memory a1, a bus system a2, a transceiver a3, and one or more application programs, where the one or more processors, the memory 71, and the transceiver a3 are connected by using the bus system a2.

The one or more application programs are stored in the memory a1, the one or more application programs include an instruction, and when the processor a0 of the portable electronic device executes the instruction, the portable electronic device executes the notification outputting method shown in FIG. 12. For the specific notification outputting method, reference may be made to the related description in the embodiment shown in FIG. 12. Details are not described herein again.

This embodiment further provides a computer-readable storage medium, where the computer-readable storage medium stores one or more programs, the one or more programs include an instruction, and when the processor a0 of the portable electronic device executes the instruction, the portable electronic device executes the notification outputting method shown in FIG. 12.

For a specific description of the one or more processors a0, reference may be made to the related description of the processing module B. Details are not described in this embodiment herein again. For a specific description of the memory a1, reference may be made to the related description of the storage module E. Details are not described in this embodiment herein again.

The bus system a2 may include a data bus, a power bus, a control bus, a signal status bus, and the like. For clear description in this embodiment, various buses in FIG. 24 are marked as the bus system a2.

The transceiver a3 may be specifically an interface circuit on the portable electronic device. The transceiver may be a radio transceiver. For example, the radio transceiver may be an antenna of the portable electronic device or the like. Data is received and sent between the one or more processors a0 and another device by using the transceiver a3. The transceiver a3 may be corresponding to the output module C and/or the communications module D.

During specific implementation, the steps in the method procedure shown in FIG. 12 may be implemented by executing, by the processor a0 in a hardware form, a computer executable instruction in a software form stored in the memory a1. To avoid repetition, details are not described herein again.

It should be noted that, for a detailed description of the portable electronic device provided in this embodiment, reference may be made to the related content in the foregoing method embodiments of the present invention. Details are not described in this embodiment herein again.

When the geographical coordinates $a_1$ are located outside the geo-fence whose radius is $r_1$ and the moving speed $v_1$ is greater than the first preset value (that is, the portable electronic device approaches but does not reach the geo-fence, and will fast go through the geo-fence), if the distance between the geographical coordinates $a_1$ of the portable electronic device and the center point of the geo-fence is less than the second preset value, the portable electronic device provided in this embodiment may output a notification after a delay of the preset duration. This can ensure that a geo-fencing application works properly.

According to the foregoing descriptions of the implementations, a person skilled in the art can clearly understand that, for the purpose of convenient and brief description, division of the foregoing function modules is used as an example for description. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or at least two units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of the present invention. The foregoing storage medium includes any medium that can store program code, such as a storage card, a SIM card, a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A notification outputting method for a portable electronic device, the method comprising:
   obtaining, periodically and according to a period ti, geographical coordinates a1 and a moving speed v1 of the portable electronic device after a first geo-fence is set, wherein an initial radius of the first geo-fence is r1, and wherein the first geo-fence has a first center point;
   setting a second geo-fence in response to the geographical coordinates a1 being located outside the first geo-fence and further in response to the moving speed v1 being greater than a preset threshold, wherein an initial radius of the second geo-fence is r2, wherein r2>r1, and wherein a second center point of the second geo-fence is the same as the first center point;
   obtaining, periodically and according to the period t1, geographical coordinates a2 and a moving speed v2 of the portable electronic device after the second geo-fence is set;
   adjusting the period ti from the period t1 to the period t2 in response to the geographical coordinates a2 being located within the second geo-fence and being located outside the first geo-fence, wherein t2<t1;
   obtaining, periodically and according to the period t2, geographical coordinates a3 and a moving speed v3 of the portable electronic device; and
   outputting a notification in response to the geographical coordinates a3 being located within the first geo-fence.

2. The method according to claim 1, wherein obtaining a moving speed that is one or more of the moving speed v1, the moving speed v2, or the moving speed v3 comprises:
   obtaining the moving speed of the portable electronic device by dividing a distance between geographical coordinates obtained at two different times by a time difference of the two different times.

3. The method according to claim 1, wherein the method further comprises:
   adjusting the radius of the first geo-fence from r1 to r3 after the adjusting the period t1 from the period t1 to the period t2, wherein r3 is greater than r1, and r3 is less than r2.

4. The method according to claim 1, wherein r2 is greater than or equal to a sum of r1 and a product of v1 and t1.

5. A notification outputting method for a portable electronic device, the method comprising:
   obtaining, periodically and according to a period t1, geographical coordinates a1 and a moving speed v1 of the portable electronic device after a first geo-fence is set, wherein an initial radius of the first geo-fence is r1, and wherein the first geo-fence has a first center point;
   setting a second geo-fence in response to the geographical coordinates a1 being located outside the first geo-fence and the moving speed v1 being greater than a preset threshold, wherein an initial radius of the second geo-fence is r2, r2>r1, and a second center point of the second geo-fence is the same as the first center point;
   obtaining, periodically and according to a period t2, geographical coordinates a2 and a moving speed v2 of the portable electronic device after the second geo-fence is set; and
   outputting a notification after a preset duration in response to the geographical coordinates a2 being located within the second geo-fence and being located outside the first geo-fence.

6. The method according to claim 5, wherein obtaining a moving speed that is one or more of the moving speed v1, or the moving speed v2 comprises:
   obtaining the moving speed of the portable electronic device by dividing a distance between geographical coordinates obtained at two different times by a time difference of the two different times.

7. The method according to claim 5, wherein t2<t1, or t2=t1.

8. The method according to of claim 5, wherein the preset duration is constant.

9. The method according to of claim 5, wherein the preset duration decreases as a speed of the portable electronic device increases.

10. An portable device, wherein the portable device comprises:

a transceiver;

at least one processor; and a non-transitory computer-readable storage medium coupled to the at least one processor and storing program instructions for execution by the at least one processor, the program instructions cause the at least one processor to:

obtain, periodically and according to a period t1, geographical coordinates a1 and a moving speed v1 of the portable device after a first geo-fence is set, wherein an initial radius of the first geo-fence is r1, and wherein the first geo-fence has a first center point;

set a second geo-fence in response to the geographical coordinates a1 being located outside the first geo-fence and the moving speed v1 being greater than a preset threshold, wherein an initial radius of the second geo-fence is r2, r2>r1, and a second center point of the second geo-fence is the same as the first center point;

obtain, periodically and according to the period t1, geographical coordinates a2 and a moving speed v2 of the portable device after the second geo-fence is set;

adjust the period t1 from the period t1 to the period t2 in response to the geographical coordinates a2 being located within the second geo-fence and being located outside the first geo-fence, wherein t2<t1;

obtain, periodically and according to the period t2, geographical coordinates a3 and a moving speed v3 of the portable device; and output a notification in response to the geographical coordinates a3 being located within the first geo-fence.

11. The portable device according to claim 10, wherein the program instructions further cause the at least one processor to obtain a moving speed that is one or more of the moving speed v1, the moving speed v2, or the moving speed v3 by dividing a distance between geographical coordinates obtained at two different times by a time difference of the two different times.

12. The portable device according to claim 10, wherein the program instructions further cause the at least one processor to:

adjust the radius of the first geo-fence from r1 to r3 after adjusting the period t1 from the period t1 to the period t2, wherein r3 is greater than r1, and r3 is less than r2.

13. The portable device according to claim 10, wherein r2 is greater than or equal to a sum of r1 and a product of v1 and t1.

* * * * *